US012199372B2

(12) United States Patent
Pepe et al.

(10) Patent No.: US 12,199,372 B2
(45) Date of Patent: Jan. 14, 2025

(54) COUPLERS FOR SINGLE PAIR CONNECTORS

(71) Applicant: CommScope Technologies LLC, Hickory, NC (US)

(72) Inventors: Paul John Pepe, Clemmons, NC (US); Shawn Phillip Tobey, Trinity, NC (US)

(73) Assignee: CommScope Technologies LLC, Hickory, NC (US)

( * ) Notice: Subject to any disclaimer, the term of this patent is extended or adjusted under 35 U.S.C. 154(b) by 444 days.

(21) Appl. No.: 17/587,755

(22) Filed: Jan. 28, 2022

(65) Prior Publication Data

US 2022/0278476 A1 Sep. 1, 2022

Related U.S. Application Data

(60) Provisional application No. 63/154,382, filed on Feb. 26, 2021.

(51) Int. Cl.
*H01R 13/506* (2006.01)
*H01R 13/66* (2006.01)

(52) U.S. Cl.
CPC ......... *H01R 13/506* (2013.01); *H01R 13/665* (2013.01)

(58) Field of Classification Search
CPC .. H01R 13/506; H01R 13/665; H01R 13/502; H01R 2103/00; H01R 31/06; H01R 13/6463
See application file for complete search history.

(56) References Cited

U.S. PATENT DOCUMENTS 2,673,968 A 3/1954 Smith
2,813,257 A 11/1957 Cornell, Jr.
(Continued)

FOREIGN PATENT DOCUMENTS

CN 1408135 A 4/2003
CN 1977428 A 6/2007
(Continued)

OTHER PUBLICATIONS

Bapat, "On the design and analysis of compliant mechanisms using the pseudo-rigid-body model concept." Retrieved from the Internet: <https://scholarsmine.mst.edu/cgi/viewcontent.cgi?article=3378&context=doctoral_dissertations>. Doctoral Dissertation, Missouri University of Science and Technology, 295 pages (2015).
(Continued)

*Primary Examiner* — Briggitte R. Hammond
(74) *Attorney, Agent, or Firm* — Merchant & Gould P.C.

(57) ABSTRACT

A coupler includes a housing and a contact sub-assembly. The housing includes a channel having openings at first and second ends of the housing. The first end receives a first connector having a first pair of contacts and the second end receives a second connector having a second pair of contacts. The contact sub-assembly includes exactly one pair of coupling contacts and a body portion supporting the pair of coupling contacts. The contact sub-assembly is positioned centrally within the housing and includes an anti-rotation feature and one or more crush ribs to create an interference fit with an interior surface of the housing. The pair of coupling contacts serve to couple the first and second connectors for both power and data transmission. In certain embodiments, contacts sub-assembly utilizes a circuit board to electrically couple contacts.

17 Claims, 26 Drawing Sheets

(56) References Cited

U.S. PATENT DOCUMENTS

| | | | |
|---|---|---|---|
| 3,199,060 | A | 8/1965 | Marasco |
| 3,827,007 | A | 7/1974 | Fairbairn |
| 3,828,706 | A | 8/1974 | Scott |
| 4,054,350 | A | 10/1977 | Hardesty |
| 4,449,767 | A | 5/1984 | Weidler |
| 4,458,971 | A | 7/1984 | D'Urso et al. |
| 4,565,416 | A | 1/1986 | Rudy et al. |
| 4,702,538 | A | 10/1987 | Hutter et al. |
| 4,743,208 | A | 5/1988 | Weisenburger |
| 4,744,774 | A | 5/1988 | Pauza |
| 4,824,394 | A | 4/1989 | Roath et al. |
| 4,917,625 | A | 4/1990 | Haile |
| 4,932,906 | A | 6/1990 | Kaley et al. |
| 5,013,255 | A | 5/1991 | Juret et al. |
| 5,014,407 | A | 5/1991 | Boughten et al. |
| 5,240,436 | A | 8/1993 | Bradley et al. |
| 5,317,663 | A | 5/1994 | Beard et al. |
| 5,368,499 | A | 11/1994 | Hirt |
| 5,385,476 | A | 1/1995 | Jasper |
| 5,496,184 | A | 3/1996 | Garrett et al. |
| 5,504,654 | A | 4/1996 | Knox et al. |
| 5,533,915 | A | 7/1996 | Deans |
| 5,580,264 | A | 12/1996 | Aoyama et al. |
| 5,647,119 | A | 7/1997 | Bourbeau et al. |
| 5,692,080 | A | 11/1997 | Lu |
| 5,732,174 | A | 3/1998 | Carpenter et al. |
| 5,748,819 | A | 5/1998 | Szentesi et al. |
| 5,749,755 | A | 5/1998 | Genta et al. |
| 5,833,496 | A | 11/1998 | Hollander et al. |
| 5,897,404 | A | 4/1999 | Goodman et al. |
| 5,915,989 | A | 6/1999 | Adriaenssens et al. |
| 5,984,703 | A | 11/1999 | Weingartner |
| 5,989,057 | A | 11/1999 | Gerke et al. |
| 6,019,521 | A | 2/2000 | Manning et al. |
| 6,045,389 | A | 4/2000 | Ferrill et al. |
| 6,050,845 | A | 4/2000 | Smalley, Jr. et al. |
| 6,065,994 | A | 5/2000 | Hashim et al. |
| 6,135,804 | A | 10/2000 | Lux |
| 6,217,230 | B1 | 4/2001 | Matsushita |
| 6,254,440 | B1 | 7/2001 | Ko et al. |
| 6,270,372 | B1 | 8/2001 | Jenner et al. |
| 6,272,738 | B1 | 8/2001 | Holliday et al. |
| 6,280,230 | B1 | 8/2001 | Takase et al. |
| 6,305,950 | B1 | 10/2001 | Doorhy |
| 6,371,793 | B1 | 4/2002 | Doorhy et al. |
| 6,390,687 | B1 | 5/2002 | Shirakawa |
| 6,402,571 | B1 | 6/2002 | Muller et al. |
| 6,410,845 | B2 | 6/2002 | Reede |
| 6,488,550 | B1 | 12/2002 | Kikuchi et al. |
| 6,499,889 | B1 | 12/2002 | Shirakawa et al. |
| 6,568,967 | B2 | 5/2003 | Inaba et al. |
| 6,572,276 | B1 | 6/2003 | Theis et al. |
| 6,641,431 | B2 | 11/2003 | Saitoh |
| 6,648,673 | B2 | 11/2003 | Watanabe |
| 6,702,617 | B1 | 3/2004 | Clement et al. |
| 6,729,901 | B2 | 5/2004 | Aekins |
| 6,805,577 | B2 | 10/2004 | Murakami et al. |
| 6,988,914 | B2 | 1/2006 | Pepe et al. |
| 7,004,797 | B2 | 2/2006 | Harada et al. |
| 7,118,423 | B2 | 10/2006 | Kobayashi et al. |
| 7,131,864 | B2 | 11/2006 | Peng |
| 7,153,156 | B1 | 12/2006 | Malstrom |
| 7,201,601 | B2 | 4/2007 | Lappohn |
| 7,217,162 | B2 | 5/2007 | Harada et al. |
| 7,278,854 | B1 | 10/2007 | Robinette et al. |
| 7,291,046 | B2 | 11/2007 | Russelburg |
| 7,297,025 | B2 | 11/2007 | Wei |
| 7,318,272 | B1 | 1/2008 | Steiner |
| 7,325,976 | B2 | 2/2008 | Gurreri et al. |
| 7,537,393 | B2 | 5/2009 | Anderson et al. |
| 7,559,789 | B2 | 7/2009 | Hashim |
| 7,618,297 | B2 | 11/2009 | Wang |
| 7,867,033 | B2 | 1/2011 | Kumagai et al. |
| 7,909,622 | B2 | 3/2011 | Pepe et al. |
| 7,955,112 | B2 | 6/2011 | Yang et al. |
| 8,006,372 | B2 | 8/2011 | Caveney et al. |
| 8,052,482 | B1 | 11/2011 | Lin |
| 8,109,789 | B2 | 2/2012 | Tyler |
| 8,113,889 | B2 | 2/2012 | Zhang et al. |
| 8,172,468 | B2 | 5/2012 | Jones et al. |
| 8,303,337 | B2 | 11/2012 | Ballard et al. |
| 8,382,382 | B2 | 2/2013 | Nelson |
| 8,454,378 | B2 | 6/2013 | Osterhart et al. |
| 8,684,763 | B2 | 4/2014 | Mattson et al. |
| 8,690,596 | B2 | 4/2014 | Su et al. |
| 8,715,016 | B2 | 5/2014 | DeBock et al. |
| 8,757,895 | B2 | 6/2014 | Petersen |
| 8,821,031 | B2 | 9/2014 | Lin et al. |
| 8,839,506 | B2 | 9/2014 | Slater et al. |
| 8,840,424 | B2 | 9/2014 | Kudo |
| 8,888,535 | B2 * | 11/2014 | Knight ............... H01R 13/5221 439/650 |
| 8,911,260 | B2 | 12/2014 | Golko et al. |
| 8,915,759 | B2 | 12/2014 | Miyamoto |
| 8,952,703 | B2 | 2/2015 | Font Aranega et al. |
| 8,979,572 | B2 | 3/2015 | Mochizuki |
| 8,979,574 | B2 | 3/2015 | Daily, Jr. et al. |
| 8,987,933 | B2 | 3/2015 | Yu |
| 9,077,106 | B2 | 7/2015 | Suzuki |
| 9,093,807 | B2 | 7/2015 | O'Connor et al. |
| 9,112,293 | B2 | 8/2015 | Suzuki |
| 9,136,652 | B2 | 9/2015 | Ngo |
| 9,172,169 | B2 | 10/2015 | Hagio et al. |
| 9,209,578 | B2 | 12/2015 | Mochizuki |
| 9,293,877 | B2 | 3/2016 | Wong et al. |
| 9,306,313 | B2 | 4/2016 | Heggemann et al. |
| 9,343,822 | B2 | 5/2016 | Sparrowhawk et al. |
| 9,356,439 | B2 | 5/2016 | Keith et al. |
| 9,366,829 | B2 | 6/2016 | Czosnowski et al. |
| 9,490,591 | B2 | 11/2016 | Yamashita et al. |
| 9,590,339 | B2 | 3/2017 | Oberski et al. |
| 9,599,776 | B2 | 3/2017 | Shimakawa |
| 9,634,417 | B2 | 4/2017 | Ramanna et al. |
| 9,685,726 | B2 | 6/2017 | Ang et al. |
| 9,692,161 | B2 | 6/2017 | Lindkamp et al. |
| 9,799,981 | B2 | 10/2017 | Weber |
| 9,853,388 | B2 | 12/2017 | Copper et al. |
| 9,917,390 | B1 | 3/2018 | Bianca et al. |
| 9,972,932 | B2 | 5/2018 | Copper et al. |
| 10,061,090 | B2 | 8/2018 | Coenegracht |
| 10,069,269 | B2 | 9/2018 | Takahashi |
| 10,164,383 | B2 | 12/2018 | Feng |
| 10,389,062 | B2 | 8/2019 | Zebhauser et al. |
| 10,403,996 | B2 | 9/2019 | Pan et al. |
| 10,411,409 | B2 | 9/2019 | Hashim et al. |
| 10,502,904 | B2 | 12/2019 | Yang |
| 10,535,969 | B2 | 1/2020 | Sutter |
| 10,665,974 | B2 | 5/2020 | Oberski et al. |
| 10,665,985 | B2 | 5/2020 | Keith et al. |
| 10,727,626 | B2 | 7/2020 | Murray |
| 10,768,374 | B2 | 9/2020 | Gurreri et al. |
| 10,950,962 | B2 | 3/2021 | Schmidbauer et al. |
| 10,998,685 | B2 | 5/2021 | Curtis et al. |
| 11,031,719 | B2 | 6/2021 | Somanathapura Ramanna |
| 11,271,350 | B2 | 3/2022 | Moffitt et al. |
| 11,296,463 | B2 | 4/2022 | Keith et al. |
| 11,362,463 | B2 | 6/2022 | Tobey et al. |
| 11,394,132 | B2 | 7/2022 | Ohfuku et al. |
| 11,652,319 | B2 | 5/2023 | Pepe et al. |
| 11,652,322 | B2 | 5/2023 | Keith et al. |
| 2001/0018287 | A1 | 8/2001 | Reichle |
| 2002/0055294 | A1 | 5/2002 | Murakami et al. |
| 2002/0072275 | A1 | 6/2002 | Arai |
| 2003/0017740 | A1 | 1/2003 | Watanabe |
| 2004/0152360 | A1 | 8/2004 | Harris et al. |
| 2004/0266255 | A1 | 12/2004 | Lee |
| 2005/0227545 | A1 | 10/2005 | Lahoreau et al. |
| 2005/0232566 | A1 | 10/2005 | Rapp et al. |
| 2005/0277335 | A1 | 12/2005 | Gordon et al. |
| 2006/0134966 | A1 | 6/2006 | Lappohn |
| 2006/0183359 | A1 | 8/2006 | Gerber et al. |
| 2006/0189215 | A1 | 8/2006 | Ellis et al. |
| 2007/0270043 | A1 | 11/2007 | Pepe et al. |
| 2007/0287332 | A1 | 12/2007 | Gordon et al. |

(56) References Cited

U.S. PATENT DOCUMENTS

| | | | |
|---|---|---|---|
| 2008/0057793 | A1 | 3/2008 | Gerber et al. |
| 2009/0176415 | A1 | 7/2009 | AbuGhazaleh et al. |
| 2009/0269954 | A1 | 10/2009 | Loch et al. |
| 2010/0003863 | A1 | 1/2010 | Siemon et al. |
| 2010/0035454 | A1 | 2/2010 | Morgan et al. |
| 2010/0040332 | A1 | 2/2010 | Van Den Meersschaut et al. |
| 2010/0041273 | A1 | 2/2010 | Scherer et al. |
| 2010/0071202 | A1 | 3/2010 | Peng et al. |
| 2010/0120284 | A1 | 5/2010 | Oka et al. |
| 2010/0173528 | A1 | 7/2010 | Martich et al. |
| 2010/0221951 | A1 | 9/2010 | Pepe et al. |
| 2010/0304600 | A1 | 12/2010 | Busse |
| 2010/0319963 | A1 | 12/2010 | James et al. |
| 2011/0097942 | A1 | 4/2011 | Dooley et al. |
| 2011/0143602 | A1 | 6/2011 | Niitsu |
| 2011/0286702 | A1 | 11/2011 | Nielson et al. |
| 2011/0294342 | A1 | 12/2011 | DeBock et al. |
| 2012/0004655 | A1 | 1/2012 | Kim et al. |
| 2012/0204417 | A1 | 8/2012 | Stull |
| 2013/0075149 | A1 | 3/2013 | Golko et al. |
| 2013/0090014 | A1 | 4/2013 | Champion |
| 2013/0171885 | A1 | 7/2013 | Zhang |
| 2013/0189873 | A1 | 7/2013 | Maranto et al. |
| 2013/0252469 | A1 | 9/2013 | Mochizuki |
| 2013/0252483 | A1 | 9/2013 | Mochizuki |
| 2013/0286896 | A1 | 10/2013 | Selph et al. |
| 2014/0038462 | A1 | 2/2014 | Coffey et al. |
| 2014/0094059 | A1 | 4/2014 | Pepe et al. |
| 2014/0213119 | A1 | 7/2014 | Thackston et al. |
| 2015/0083455 | A1 | 3/2015 | Keith et al. |
| 2015/0144395 | A1 | 5/2015 | Tanaka |
| 2015/0155670 | A1 | 6/2015 | Gardner |
| 2015/0207254 | A1 | 7/2015 | Kamei et al. |
| 2015/0214667 | A1 | 7/2015 | Chen et al. |
| 2015/0249295 | A1 | 9/2015 | Tseng |
| 2016/0028198 | A1 | 1/2016 | Yamashita et al. |
| 2016/0093984 | A1 | 3/2016 | Iwamoto |
| 2016/0131858 | A1 | 5/2016 | Anderson et al. |
| 2016/0141790 | A1 | 5/2016 | Martin et al. |
| 2016/0164223 | A1 | 6/2016 | Zebhauser et al. |
| 2016/0192527 | A1 | 6/2016 | Anderson et al. |
| 2016/0294111 | A1 | 10/2016 | Kobayashi et al. |
| 2016/0315436 | A1 | 10/2016 | Plamondon et al. |
| 2016/0344139 | A1 | 11/2016 | O'Young et al. |
| 2016/0370550 | A1 | 12/2016 | Barry et al. |
| 2017/0005445 | A1 | 1/2017 | Resendez et al. |
| 2017/0077966 | A1 | 3/2017 | Chen et al. |
| 2017/0184798 | A1 | 6/2017 | Coenegracht |
| 2017/0207561 | A1 | 7/2017 | Scherer et al. |
| 2017/0264025 | A1 | 9/2017 | Lappöhn |
| 2017/0373405 | A1 | 12/2017 | Lappoehn |
| 2018/0287312 | A1 | 10/2018 | De Dios Martin et al. |
| 2018/0358739 | A1 | 12/2018 | De Dios Martin |
| 2019/0154923 | A1 | 5/2019 | Flaig |
| 2019/0296491 | A1 | 9/2019 | Maesoba et al. |
| 2020/0036130 | A1 | 1/2020 | Fontaine et al. |
| 2020/0106216 | A1 | 4/2020 | Hashim et al. |
| 2020/0153174 | A1 | 5/2020 | Curtis et al. |
| 2020/0274273 | A1 | 8/2020 | Oberski et al. |
| 2020/0350730 | A1 | 11/2020 | Keith et al. |
| 2021/0083441 | A1 | 3/2021 | Moffitt et al. |
| 2021/0104843 | A1 | 4/2021 | Tobey et al. |
| 2021/0151905 | A1 | 5/2021 | Novak et al. |
| 2021/0378834 | A1 | 12/2021 | Kleiner |
| 2022/0158389 | A1 | 5/2022 | Pepe |
| 2022/0360033 | A1 | 11/2022 | Pepe et al. |
| 2022/0384984 | A1 | 12/2022 | Pepe |
| 2023/0071501 | A1 | 3/2023 | Tobey et al. |
| 2023/0238757 | A1 | 7/2023 | Pepe et al. |

FOREIGN PATENT DOCUMENTS

| | | | |
|---|---|---|---|
| CN | 102055115 | A | 5/2011 |
| CN | 102136649 | A | 7/2011 |
| CN | 103311746 | A | 9/2013 |
| CN | 104428958 | A | 3/2015 |
| CN | 105789965 | A | 7/2016 |
| CN | 106415944 | A | 2/2017 |
| CN | 107104329 | A | 8/2017 |
| CN | 209167592 | U | 7/2019 |
| DE | 10216915 | A1 | 10/2003 |
| EP | 1128494 | A2 | 8/2001 |
| EP | 1783871 | A1 | 5/2007 |
| EP | 1988611 | B1 | 8/2010 |
| EP | 2862364 | B1 | 5/2016 |
| EP | 3091614 | A1 | 11/2016 |
| FR | 2290136 | A7 | 5/1976 |
| GB | 628419 | A | 8/1949 |
| GB | 2510490 | A | 8/2014 |
| JP | 2000-67979 | A | 3/2000 |
| JP | 4514356 | B2 | 7/2010 |
| JP | 2014-38847 | A | 2/2014 |
| KR | 10-2010-0122766 | A | 11/2010 |
| KR | 10-2011-0020262 | A | 3/2011 |
| WO | 2006/048867 | A1 | 5/2006 |
| WO | 2006/138301 | A2 | 12/2006 |
| WO | 2011/163260 | A1 | 12/2011 |
| WO | 2015/058345 | A1 | 4/2015 |
| WO | 2016/132855 | A1 | 8/2016 |
| WO | 2017/019370 | A1 | 2/2017 |
| WO | 2017/152108 | A1 | 9/2017 |
| WO | 2018200528 | A1 | 11/2018 |
| WO | 2018/227057 | A1 | 12/2018 |
| WO | 2018/236875 | A1 | 12/2018 |
| WO | 2019/147774 | A1 | 8/2019 |
| WO | 2019165466 | A1 | 8/2019 |
| WO | 2019/180640 | A1 | 9/2019 |
| WO | 2020/051340 | A1 | 3/2020 |
| WO | 2020190758 | A1 | 9/2020 |
| WO | 2021067274 | A1 | 4/2021 |
| WO | 2021/252938 | A1 | 12/2021 |
| WO | 2022/006544 | A1 | 1/2022 |
| WO | 2022/006549 | A1 | 1/2022 |

OTHER PUBLICATIONS

Dibiaso et al., "Designing a Connection System for Gigabit Automotive Ethernet," SAE International Journal of Passenger Cars—Electronic and Electrical Systems, vol. 9, No. 1, pp. 134-146 (May 2016).

Her, "Methodology for Compliant Mechanisms Design" Thesis, Purdue University, 196 pages (Dec. 1986).

Koli, "A generalized approach for compliant mechanism design using the synthesis with compliance method, with experimental validation." Retrieved from the Internet: <URL: https://scholarsmine.mst.edu/cgi/viewcontent.cgi?article=8098&context=masters_theses>. Masters Thesis, Missouri University of Science and Technology, 155 pages (2013).

2-Pin Connector w/Header, .10", All Electronics Corporation, 3 pages, downloaded: http://www.allelctronics.com/item/con-242/2-pin-connector-w/header-.10/html (May 31, 2017).

2-Pin Connectors, Wiring Specialties, 5 pages (May 31, 2017).

* cited by examiner

COUPLERS FOR SINGLE PAIR CONNECTORS

CROSS-REFERENCE TO RELATED APPLICATIONS

This application claims the benefit of U.S. Provisional Patent Application No. 63/154,382, filed Feb. 26, 2021, entitled, "COUPLERS FOR SINGLE PAIR CONNECTORS." The disclosure of this priority application is hereby incorporated by reference in its entirety into the present application.

TECHNICAL FIELD

The present disclosure is directed to couplers and, more specifically, to couplers that electrically couple pairs of connectors with each connector coupled to a singled twisted pair of conductors.

BACKGROUND

A single twisted pair of conductors can be used to transmit data and/or power over a communications network that includes, for example, computers, servers, cameras, televisions, and other electronic devices including those on the internet of things (IoT), etc. In the past, this has been performed through use of Ethernet cables and connectors that typically include four pairs of conductors that are used to transmit four differential signals. Differential signaling techniques, where each signal is transmitted over a balanced pair of conductors, are used because differential signals may be affected less by external noise sources and internal noises sources such as crosstalk as compared to signals that are transmitted over unbalanced conductors.

In Ethernet cables, the insulated conductors of each differential pair are tightly twisted about each other to form four twisted pairs of conductors, and these four twisted pairs may be further twisted about each other in a so-called "core twist." A separator may be provided that is used to separate (and hence reduce coupling between) at least one of the twisted pairs from at least one other of the twisted pairs. The four twisted pairs and any separator may be enclosed in a protective jacket. Ethernet cables are connectorized with Ethernet connectors; a single Ethernet connector is configured to accommodate all four twisted pairs of conductors. However, it is possible that data and/or power transfer can be effectively supported through a singled twisted pair of conductors with its own more compact connector and cable. Couplers that can enable electrical coupling of connectors, with each connector coupled to a single pair of electrical conductors, are an important element in broadening the use of data and/or power transfer over a single pair of electrical conductors.

SUMMARY

A coupler includes a housing and a contact sub-assembly. The housing includes a channel having openings at first and second ends of the housing. The first end receives a first connector having a first pair of contacts and the second end receives a second connector having a second pair of contacts. The contact sub-assembly includes exactly one pair of coupling contacts and a body portion supporting the pair of coupling contacts. The contact sub-assembly is positioned centrally within the housing and includes an anti-rotation feature and one or more crush ribs to create an interference fit with an interior surface of the housing. The pair of coupling contacts serve to couple the first and second connectors for both power and data transmission.

In certain embodiments, the body portion that supports the anti-rotation feature with the anti-rotation feature having a width greater than a width of the body portion. In certain embodiments, the body portion includes a pair of latch arms that interface with openings in the metal housing. In certain embodiments one or both of the anti-rotation feature and the body portion of the contact sub-assembly includes one or more crush ribs that establish an interference fit with an interior surface of the housing of the coupler. In certain embodiments, one or both of the housing and the contact sub-assembly are of a symmetric configuration. In certain embodiments, the housing is made of a conductive material while in other embodiments the housing is of a non-conductive material. In certain embodiments, a first pair of opposing bonding contacts are provided at the first end of the housing and a second pair of opposing bonding contacts are provided at the second end of the housing.

In certain embodiments, the coupler includes a housing, a circuit board, and exactly two pairs of contacts. The housing has a first end and a second end with a channel extending between the first and second ends. The circuit board is contained within the housing and each of the contacts includes a forward end that extends into the channel and a rearward end that is electrically coupled to the circuit board. Each of the pair of contacts includes a first contact and a second contact with the circuit board including a first set of traces to electrically couple the first contacts and a second set of traces to electrically couple the second contacts. The exactly two pairs of contacts serve to electrically couple, via the circuit board, a first connector received in the first end of the housing and a second connector received in the send end of the housing.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

A coupler of the present disclosure couples a first free connector with a second free connector wherein each of the free connectors is coupled to exactly two electrical conductors. Each coupler can be utilized in a shielded (e.g., metal) or non-shielded (e.g., non-metal) form as appropriate to a specific application. Each coupler includes exactly one pair of pin contacts, preferably with a square or rectangular cross-section. Each end of the pin contacts includes four tapered faces that join at a flattened apex and are configured to be received by the tuning fork contact of the free connector. The pair of pin contacts are offset from one another and cross one another within the coupler to maintain electrical polarity as electricity travels from the tuning fork contacts of a first free connector to the pin contacts of the coupler and onward to the tuning fork contacts of a second free connector.

In certain embodiments, the coupler includes a metal shield that houses a first housing and a second housing. The first and second housing are configured to centrally interface with one another within the coupler with the pair of pin contact spanning the first and second housings. In other embodiments, the coupler includes a singular metal housing incorporating four bonding contacts as well as a contact sub-assembly. The contact sub-assembly includes a block over molding the pin contacts that is positioned centrally within the housing. Other embodiments and combinations of embodiments are also possible.

Figure 1A:
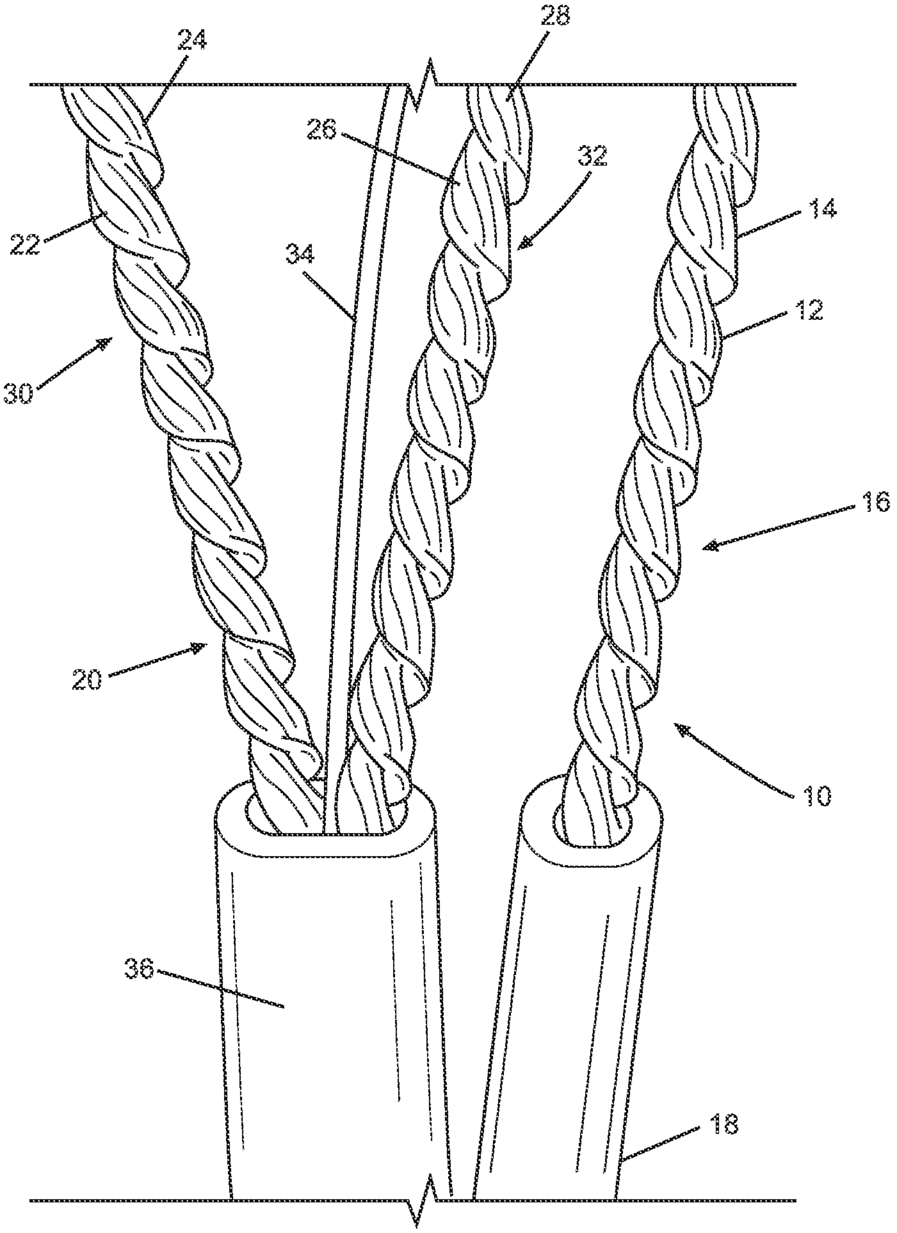
FIGS. 1A-1B illustrate example embodiments of cables having single twisted pairs of conductors.
Figure 1B:
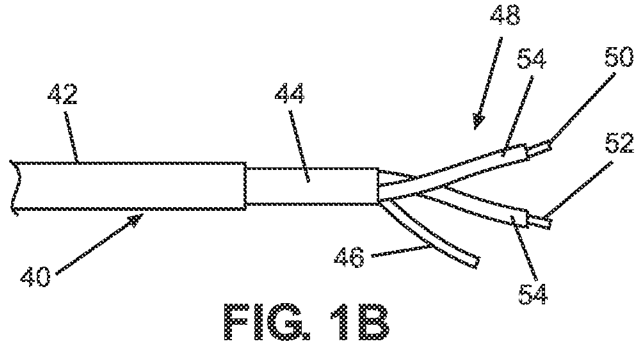
Figures 2A, 2B:
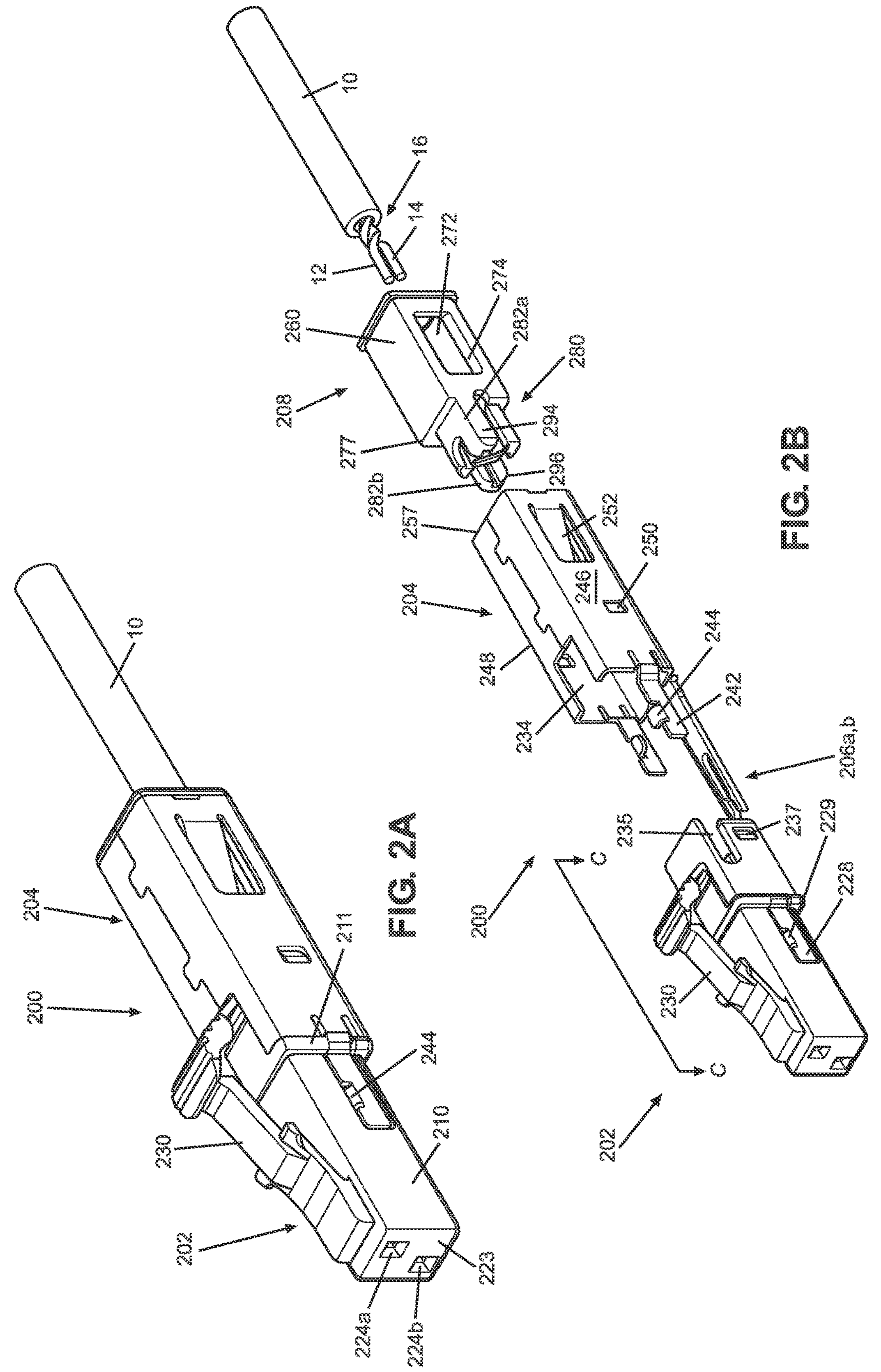
FIGS. 2A-2D illustrate an example embodiment of a free connector for a single pair of electrical conductors including an assembled view, an exploded assembly view, a cross section of a forward connector body of the connector and a pair of electrical contacts of the connector, respectively.
Figure 2C:
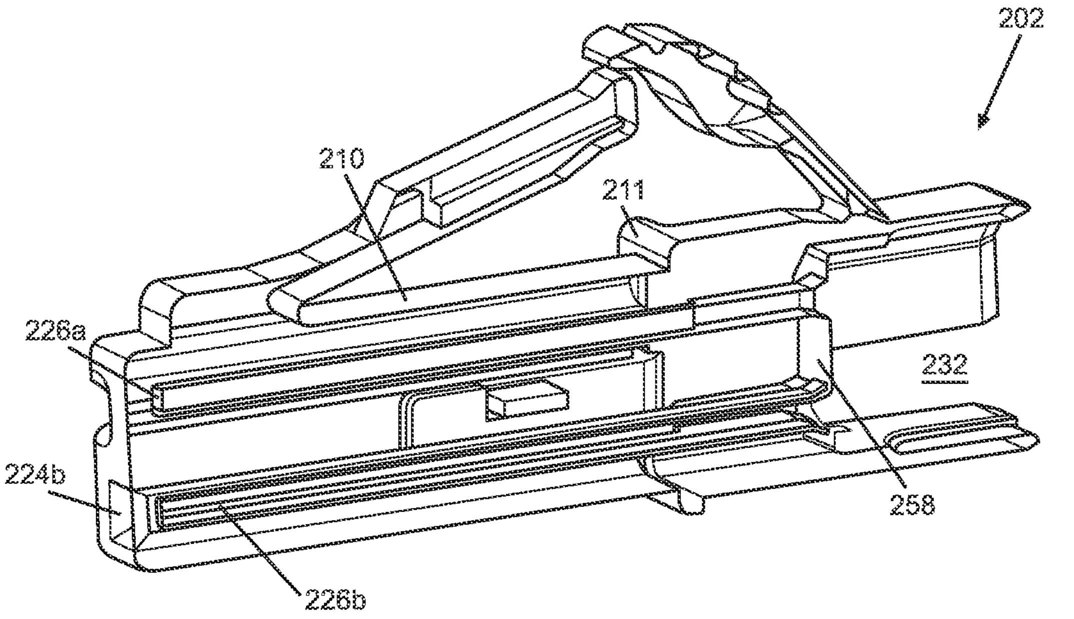
Figure 2D:
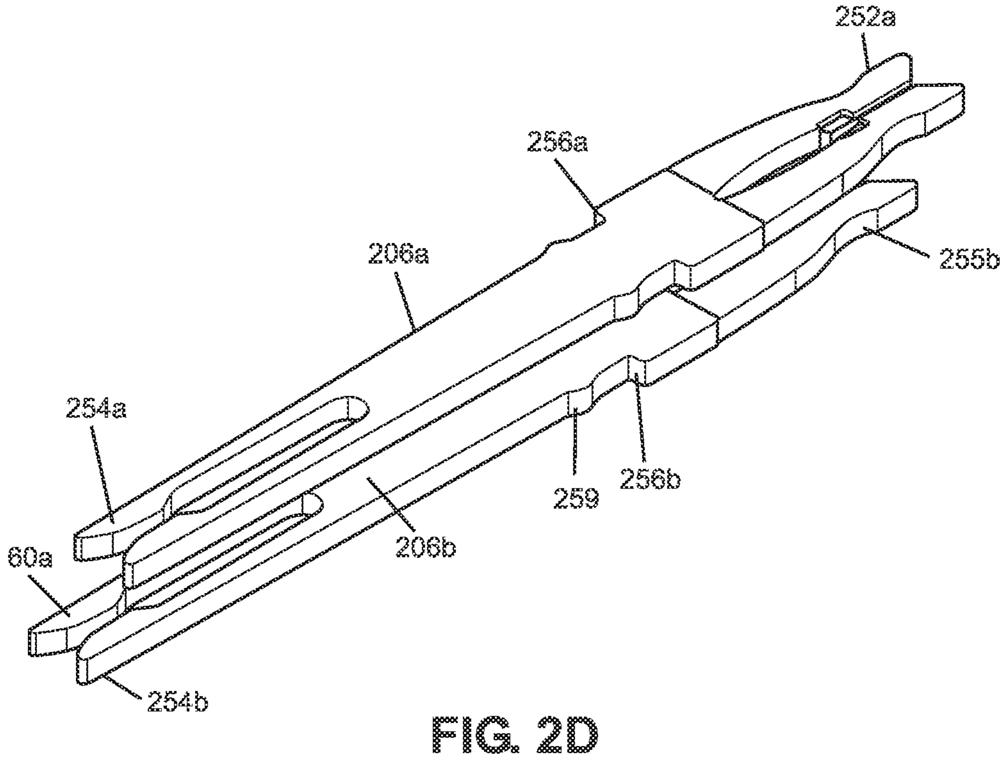

FIG. 1A illustrates two example embodiments of cables containing one or more single twisted pairs of conductors. The first cable 10 includes first and second conductors 12, 14 that are twisted together to form a single twisted pair 16. The conductors 12, 14 are enclosed by a protective jacket 18. The second cable 20 includes first through fourth conductors 22, 24, 26, 28. Conductors 22 and 24 are twisted together to form a first single twisted pair 30, and conductors 26 and 28 are twisted together to form a second single twisted pair 32. The twisted pairs 30 and 32 are separated by a separator 34 and are encased in a protective jacket 36. In certain example embodiments, the cables 10, 20 include a number of twisted pairs greater than two. In certain example embodiments, each single twisted pair of conductors, e.g., 16, 30, 32, is configured for data transmission up to 600 MHz (ffs) and has a current carrying capacity up to 1 A. Each single twisted pair of conductors, e.g., 16, 30, 32, can be connectorized with the various embodiments or combination of embodiments of free connectors and fixed connectors as described herein. FIG. 1B is an example of a shielded cable 40. The shielded cable 40 includes an outer jacket 42, a foil shield 44, a drain wire 46, and a single twisted pair 48 of conductors 50 and 52; each of the conductors 50 and 52 is provided with insulation 54.

Referring to FIGS. 2A-2D an example embodiment of a free connector 200 for a single twisted pair of electrical conductors is illustrated. Free connector 200 includes a forward connector body 202, a metal frame 204, a pair of electrical contacts 206*a*, 206*b* and a rear connector body 208. Free connector 200 can be coupled to a single twisted pair of conductors, e.g., conductors 12 and 14 of the single twisted pair 16 of cable 10.

The forward connector body 202 includes an elongate forward portion 210 and a rear receiving portion 212 that is separated by a shoulder 211.

The elongate forward portion 210 of the forward connector body 202 includes a forward face 223 having a pair of offset openings, 224*b* corresponding to contact receiving channels 226*a*, 226*b*; the openings 224*a*, 224*b* receive pin contacts that electrically interface with the tuning fork contacts 206*a*, 206*b*. In certain embodiments, a recess 228 is provided on each side face of the elongate forward portion 210 to interface with and retain the metal frame 204. Each recess 228 includes a recessed notch 229 to receive an interfacing tab 244 of the metal frame 204 to further ensure that the metal frame 204 remains secured to the forward connector body 202. The forward connector body 202 also includes a cantilevered latch 230.

The rear receiving portion 212 of the forward connector body 202 is unitary (e.g., molded as a single unit) with the elongate forward portion 210 of the forward connector body 202. The rear receiving portion 212 defines a central cavity 232 that provides rear access to the contact receiving channels 226*a*, 226*b* of the elongate forward portion 210. Each side face 231, 233 of the rear receiving portion 212 includes a slot 235 to interface with the rear connector body 208 and an outward extending tab 237 to interface with the metal frame 204.

The metal frame 204 of the free connector 200 comprises a metal shell body 240 having a central cavity 234 that is slidable over the rear receiving portion 212 of the forward connector body 202. The metal frame 204 is held in place about the rear receiving portion 212 through use of a pair of flex tabs 242 that interface with corresponding recesses 228 of the forward connector body 202. Each of the flex tabs 242 includes in inward facing tab 244 to interface with recessed notch 229 of the forward connector body 202. Each side face 246, 248 of the metal frame 204 includes an opening 250 to interface with outward extending tab 237 of the forward connector body 202. Each point of interface between the metal frame 204 and the forward connector body 202 assists in securing the metal frame 204 to the forward connector body 202. Each side face 246, 248 of the metal frame 204 is additionally equipped with an inward directed beam 252 (e.g., shield beam) to establish an electrical interface with a cable shield (foil or drain wire) of the cable carrying the single pair of conductors (e.g., see FIG. 1B). Note that, while the metal frame 204 includes a shield beam for interfacing with a shield of a shielded cable, the metal frame 204 can also be utilized in conjunction with a non-shielded cable. In the instance of a non-shielded cable, the metal frame provides additional structural support to the connector 200. In certain non-shielded uses, the frame 204 is alternatively made of a non-metal material, e.g., plastic.

Electrical contacts 206*a*, 206*b* each include a forward portion having a tuning fork receptacle contact 254*a*, 254*b* while a rear portion of each of the electrical contacts 206*a*, 206*b* includes an insulation displacement contact (IDC) 255*a*, 255*b*. Each tuning fork receptacle contact 254*a*, 254*b* includes a pair of opposing spring arms 60*a*, 60*b* presenting an angled opening to receive a pin contact. Each of the electrical contacts 206*a*, 206*b* includes a shoulder 256*a*, 256*b* that interfaces with a stop 258 (see FIG. 2C) within the elongate forward portion 210 of the forward connector body 202. The electrical contacts 206*a*, 206*b* include one or more tangs 259 to help retain each of the tuning fork receptacle contacts 254*a*, 254*b* within their respective contact receiving channels 226*a*, 226*b* of the forward connector body 202.

The rear connector body 208 of the free connector 200 includes a rear body portion 260 that defines a central cavity 272 into which is inserted a pair of conductors (e.g., conductors 12, 14). Each side face is provided with an elongate opening 274 into which the inward directed beams 252 of the metal frame 204 extend wherein an electrical interface with the foil (or drain wire) of a conductor within the cavity 272 is established. A latch (now shown) on a lower face of the rear body portion 260 interfaces with a cut-out (not shown) of the metal frame 204 to secure the rear connector body 208 to the metal frame 204. A lip edge 277 of the rear body portion 260 seats against a rear face 257 of the metal frame 204.

The rear connector body 208 of the free connector 200 includes a contact receiving portion 280 that extends forward from the rear body portion 260. The contact receiving portion 280 is essentially divided into a first half 282*a* to accommodate the upper positioned electrical contact 206*a* and a second half 282*b* to accommodate the lower positioned electrical contact 206*b*. The first half 282*a* of the contact receiving portion 280 includes an upward channel that is contoured to direct the end of a conductor upward (e.g., a 90 deg. bend) to extend through a contact receiving slot. The second half 282*b* of the contact receiving portion 280 includes a downward channel that is contoured to direct the end of a conductor downward (e.g., a 90 deg. bend) to extend through a contact receiving slot.

The IDC contacts 255*a*, 255*a* of the electrical contact 206*a*,206*b* are inserted into their respective contact receiving slots to establish an electrical interface with the conductor extending there through. The IDC contacts 255*a*, 255*b* applies a normal force to the respective conductor and cuts through both the insulation of the conductor and a portion of the conductor itself to create the electrical interface. Note that the electrical interface is established without requiring crimping of the conductor to the electrical contact, i.e., the electrical interface is crimp-less. The upward channel is, in part, defined by an upper outward extending arm 294 while the downward channel is, in part, defined by a lower outward extending arm 296. Each of upper outward extending arm 294 and lower outward extending arm 296 interface with respective corresponding slots 235 of the forward connector body 202 when the free connector 200 is assembled to assist in aligning and stabilizing the rear connector body 208 relative to the forward connector body 202.

Figure 3A:
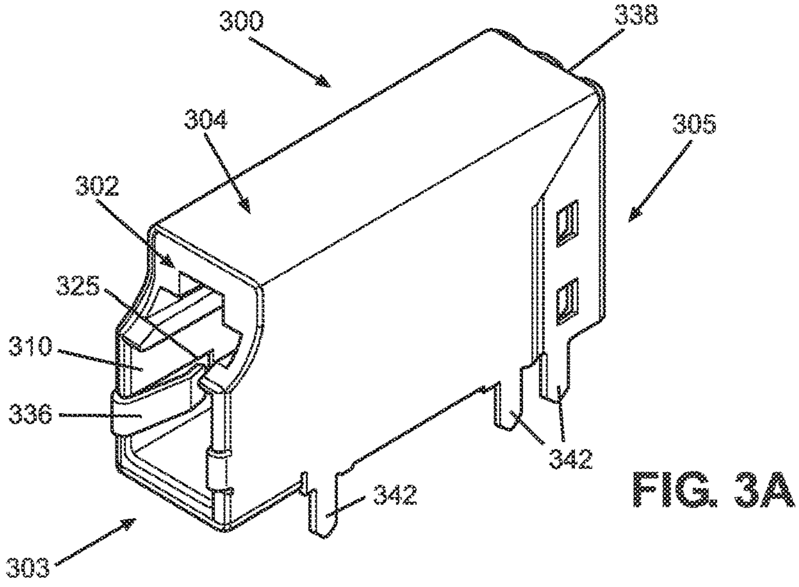
FIGS. 3A-3C illustrate an example embodiment of a fixed connector, which is configured to mate with the free connector of FIGS. 2A-2D, including an assembled perspective view, a front view and a pair of electrical contacts of the fixed connector, respectively.
Figure 3B:
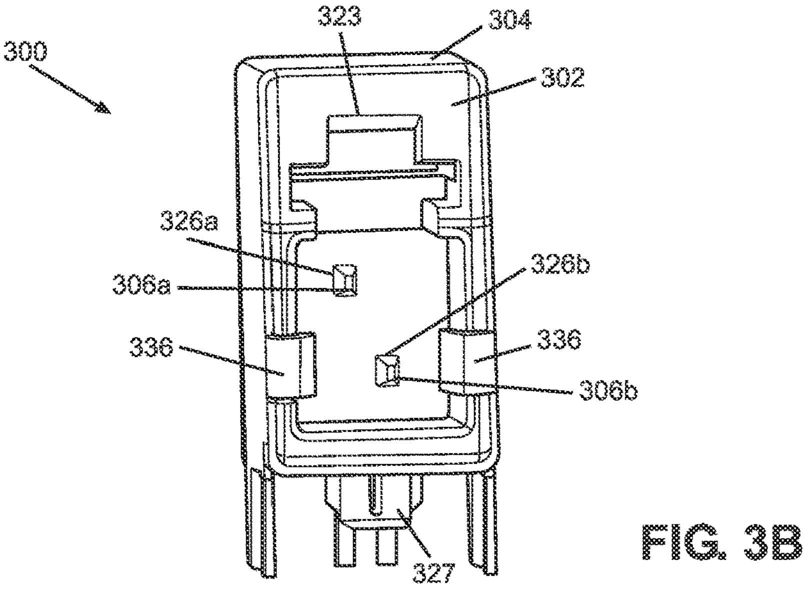
Figure 3C:
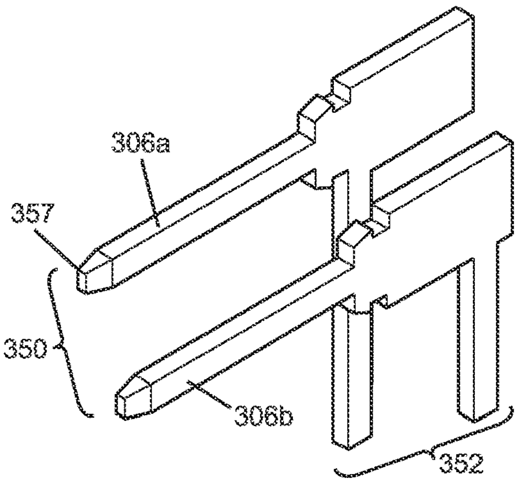

An example of a fixed connector 300, suitable to mate with free connector 200 is illustrated in FIGS. 3A-3C. The fixed connector 300 generally includes a housing body 302, a metal frame 304 and a pair of pin contacts 306*a*, 306*b* (straight or bent for board mounting). A forward end 303 and a rearward end 305 further define the fixed connector 300.

The housing body 302 of the fixed connector 300 includes a forward central channel 310 that receives the free connector 200. A notch 323 is provided within the housing body 302 to interface with the cantilevered latch 230 of the free connector 200. Further, side recesses 325 in each side face serve as an interface element for the metal frame 304. A mounting pin 327 extends from the housing body 302 and through the metal frame 2602 for circuit board mounting of the connector 300. The housing body further includes openings 326*a*, 326*b* to channels (not shown) into which the pin contacts 306*a*, 306*b* are inserted; when fully inserted, the pin contacts 306*a*, 306*b* extend into the forward central channel 310.

The metal frame 304 of the fixed connector 300 is a metal shell defining a central cavity that is slidable over the housing body 302. The metal frame 304 is held in place about the housing body 302 through use of a pair of clips 336 that interface with the side recesses 325. In certain embodiments, a back face 338 of the metal frame is enclosed with a back panel 340 while in other embodiments t back face 338 is left open. Further, in certain embodiments, the metal frame 304 is provide with one or more shield pins 342 that are insertable into vias in an application where the fixed connector 300 is board mounted.

Each of the pin contacts 306*a*, 306*b* of the fixed connector 300 include a forward portion 350 and a rear portion 352 that can be electrically coupled to a conductor, e.g., conductor 10, in any suitable manner. The forward portion 350 includes tapered faces that form a four-sided pyramid shape with a flattened apex 357; the flattened apex 357 having a rectangular or square cross-section.

Further details regarding free connectors, fixed connectors and couplers can be found in PCT publications WO 2018/200528, WO 2019/165466, and WO 2020/190758 as well as PCT Application No. PCT/US2020/053283. The identified PCT publications and applications are hereby incorporated by reference.

Figure 4B:
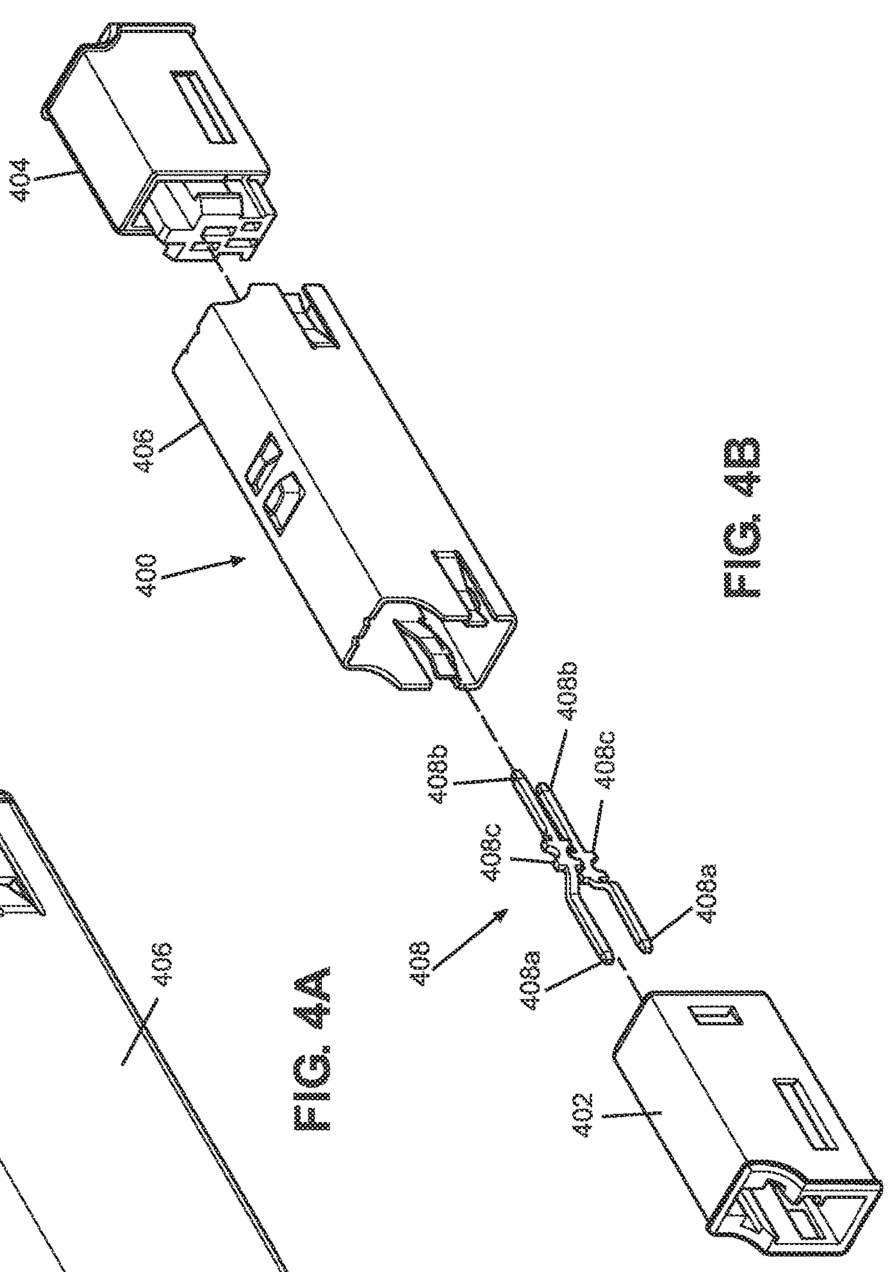
FIGS. 4A-4B illustrate an example embodiment of a shielded coupler according to the present disclosure including an assembled perspective view and an exploded assembly perspective view of the coupler, respectively.
Figure 4A:
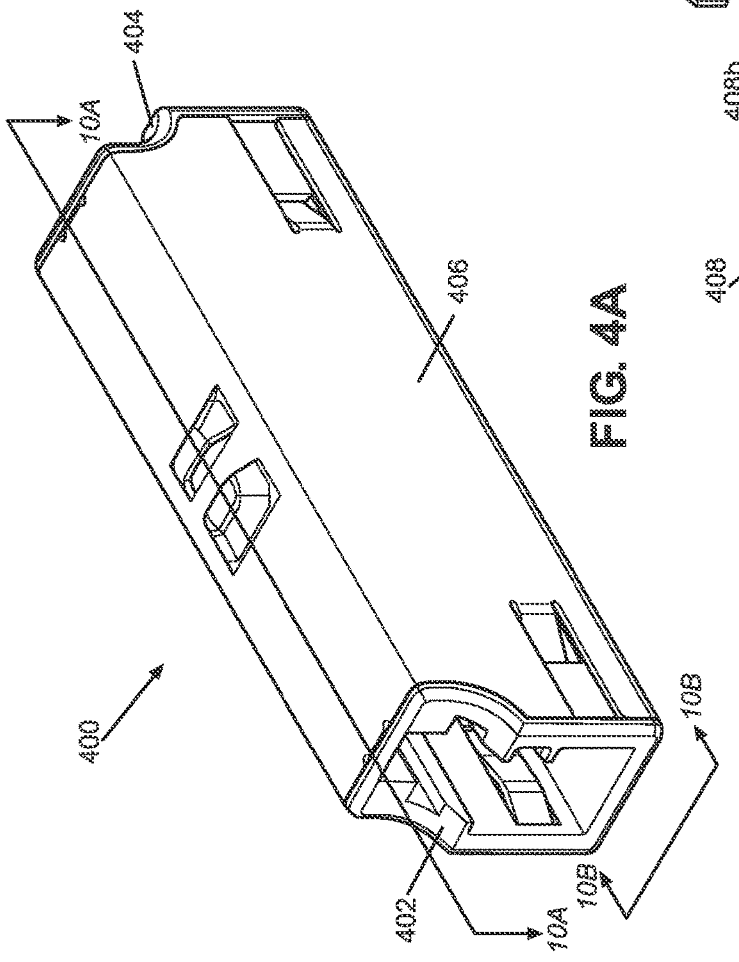

Referring to FIGS. 4A-4B an example embodiment of a coupler 400 according to the present disclosure is illustrated. As shown, the coupler 400 includes a first housing 402, a second housing 404, a metal shield 406 and a pair of contacts 408, each having a forward contact **408*a* and a rearward contact 408*b* separated by a central portion 408*c***.

Figure 5A:
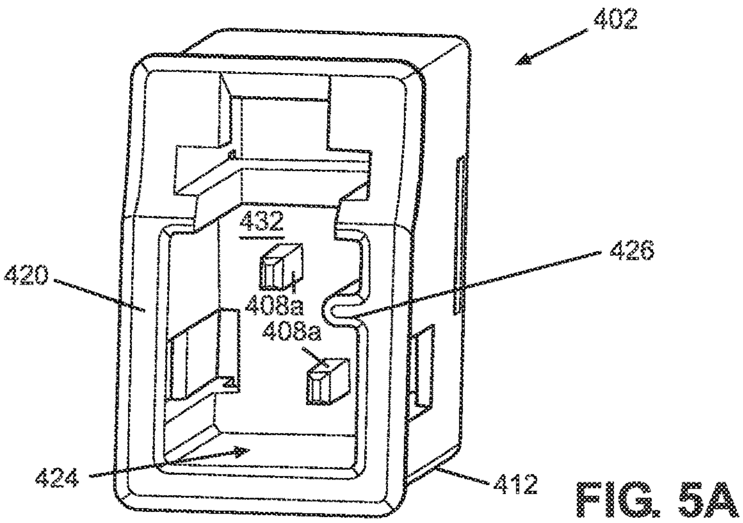
FIGS. 5A-5C provide a front perspective, side perspective and rear perspective view, respectively, of a first housing of the coupler of FIGS. 4A-4B.
Figure 5B:
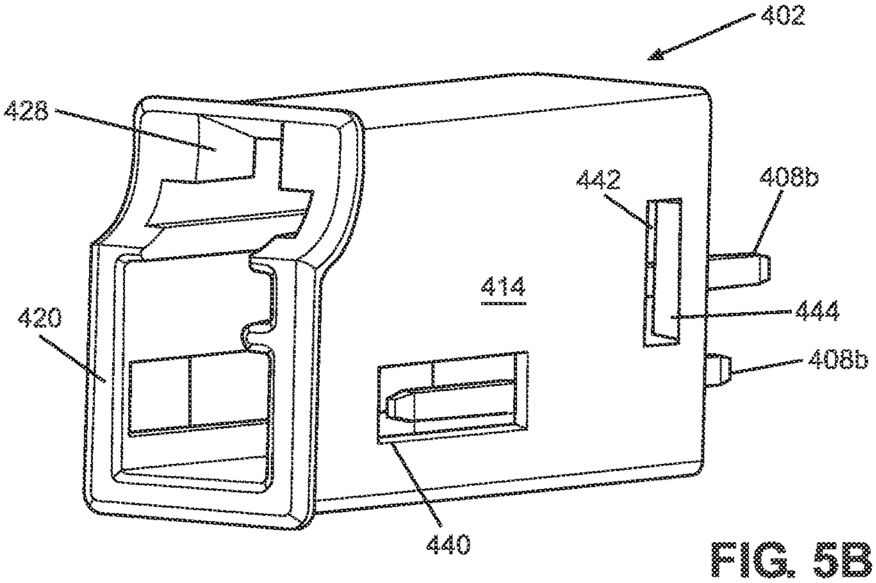
Figure 5C:
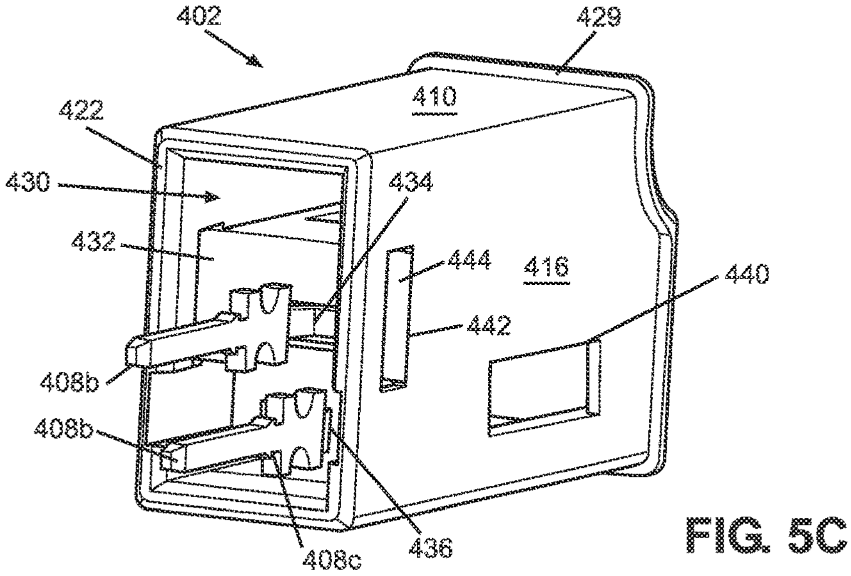
Figure 6A:
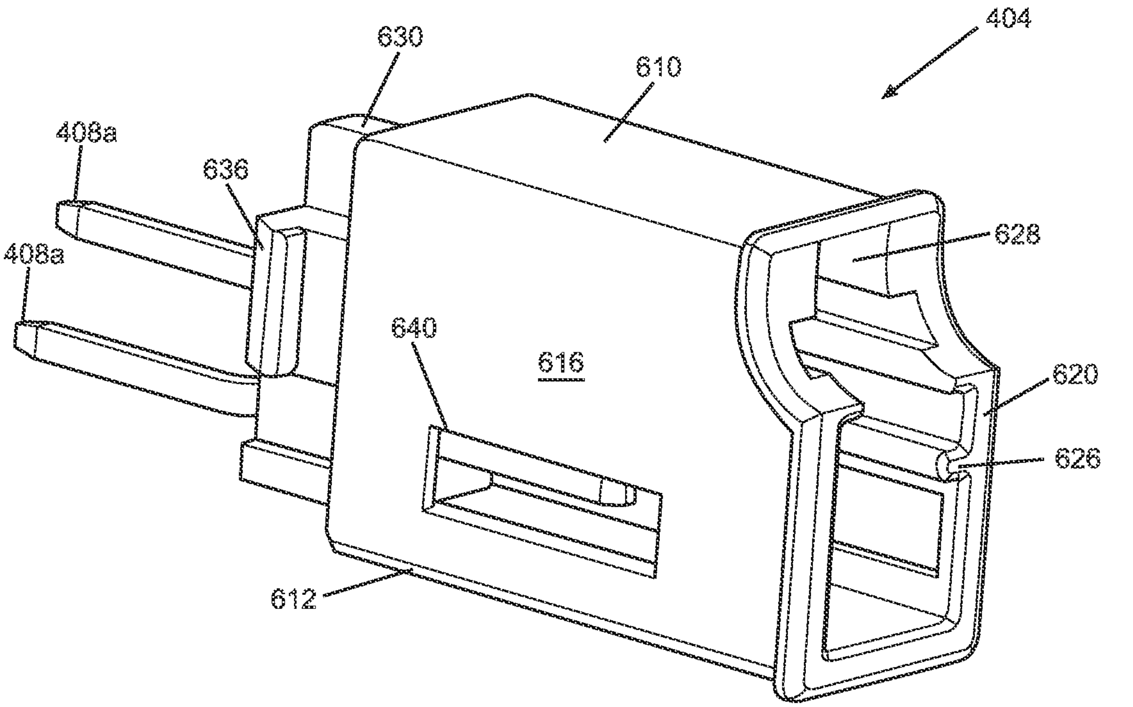
FIGS. 6A-6D provide a side perspective, front perspective, rear perspective and cross-sectional view, respectively, of a second housing of the coupler of FIGS. 4A-4B.
Figure 6B:
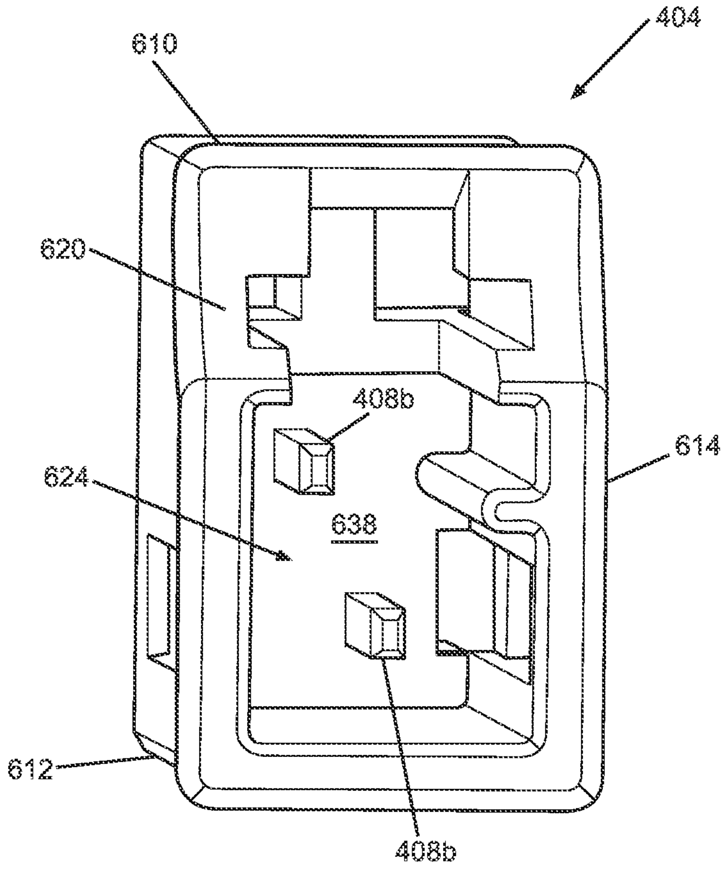
Figure 6C:
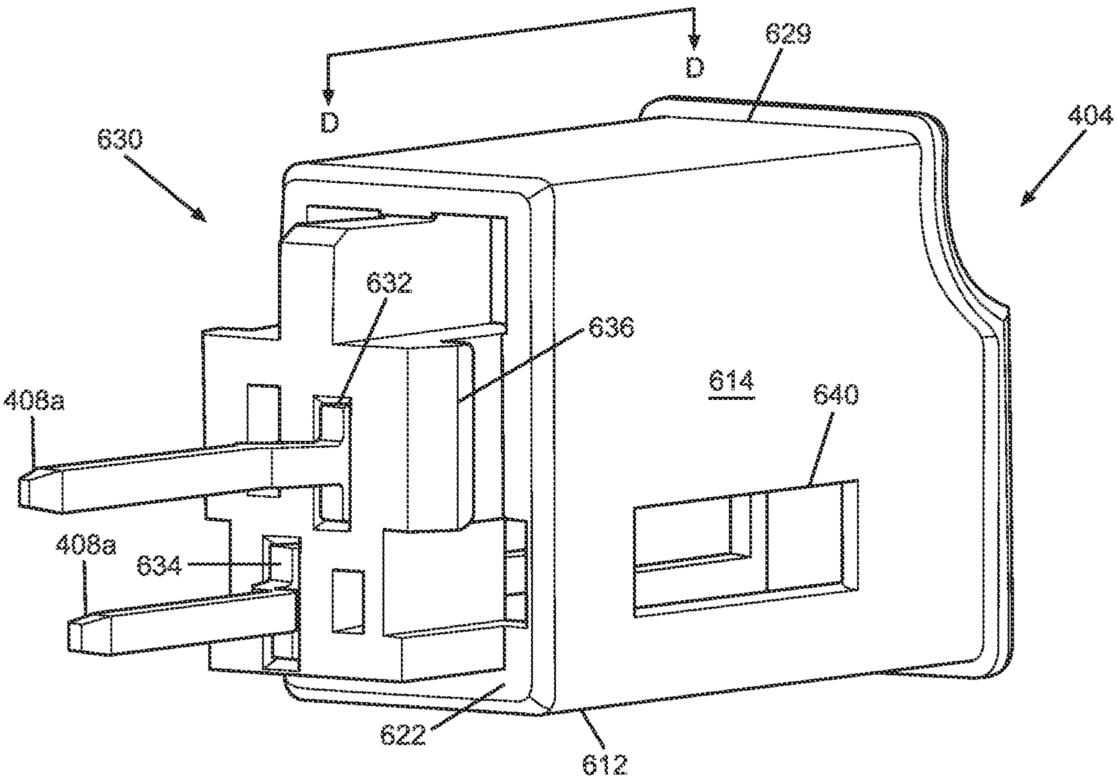
Figure 6D:
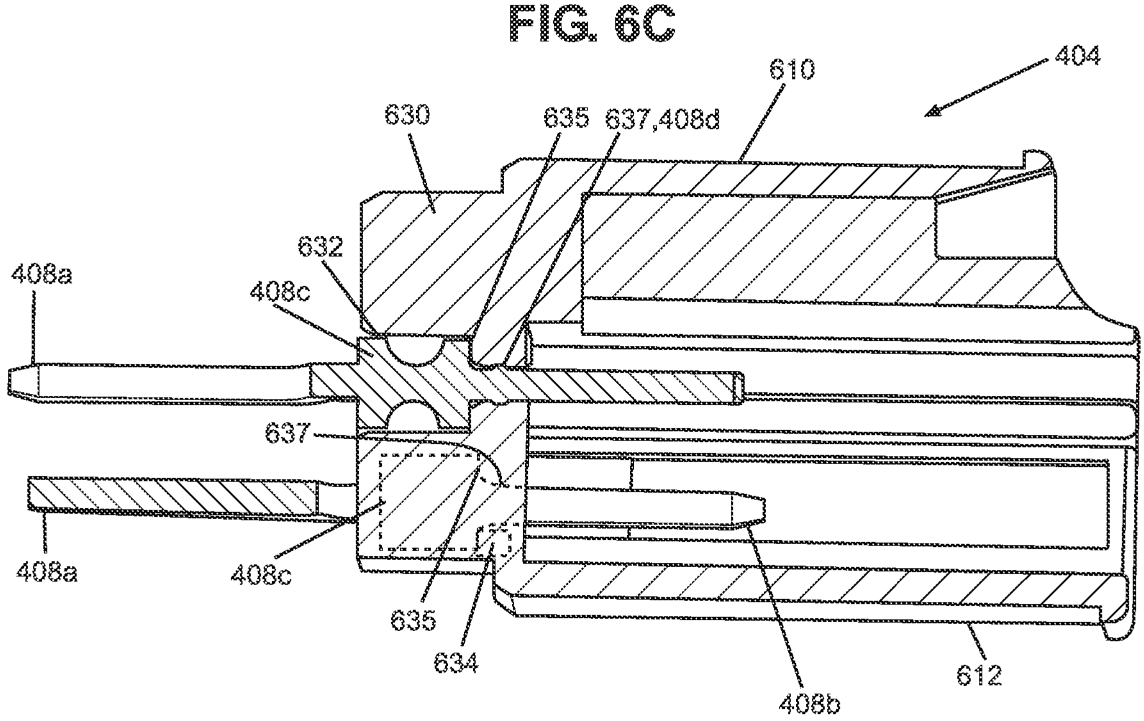

FIGS. 5A-5C further illustrate the details of the first housing 402 with the contacts 408 inserted therein. As shown, the first housing 402 includes an upper face 410 and a lower face 412 connected by a first side face 414 and a second side face 416 that, together, define a forward face 420 and a rearward face 422. The forward face 420 surrounds a forward cavity 424 into which extends the forward contact **408*a* of each of the pair of contacts 408. In certain embodiments, a projection 426 projects from one, or more, of the faces 414, 416, 420, 422 into the forward cavity 424 to align a connector 200 for insertion and/or prevent a non-compatible connector from being inserted therein. The forward face 420 further defines a recessed notched 428 that is configured to interface with and retain the cantilevered latch 230 of the connector 200. A lip edge 429 extends around the forward face 420 and serves to abut a first end 722 of the metal shield 406 when the first housing 402 is received within the first end 722**.

The rearward face 422 of the first housing 402 defines a rearward cavity 430 that is separated from the forward cavity 422 by a wall 432. The wall 432 is provided with first and second channels 434, 436 that receive the forward contacts **408*a* of each of the pair of contacts 408 allowing them to pass through to the forward cavity 422. The wall 432 further acts as a stop for the central portion 408*c* of each of the contacts 408 to prevent over-insertion of the forward contacts 408*a***.

Each of the side faces 414, 416 includes a first elongate opening 440 that receives a flex tab 726 of the metal shield 406 that retains the first housing 402 within the metal shield 406; the flex tab 726 extends into the forward cavity 422 to make contact with the metal frame 204 of a connector 200 that is received therein. Each of the side faces 414, 416 includes a second elongate opening 442, which is generally oriented perpendicular to the first elongate opening 440, and includes a flanged edge 444 that extends into the rearward cavity 430. The flanged edge 444 of the first housing 402 interfaces with a hooked tab 636 of the second housing 404 to maintain a mechanically coupled position with the second housing 404.

FIGS. 6A-6D further illustrate the details of the second housing 404 with the contacts 408 inserted therein. As shown, the second housing 404 includes an upper face 610 and a lower face 612 connected by a first side face 614 and a second side face 616 that, together, define a forward face 620 and a rearward face 622. The forward face 620 surrounds a forward cavity 624 into which extends the rearward contact **408*b* of each of the pair of contacts 408. In certain embodiments, a projection 626 projects from one, or more, of the faces 614, 616, 620, 622 into the forward cavity 624 to align a connector 200 for insertion and/or prevent a non-compatible connector from being inserted therein. The forward face 620 further defines a recessed notched 628 that is configured to interface with and retain the cantilevered latch 230 of the connector 200. A lip edge 629 surround the forward face 620 and serves to abut a second end 724 of the metal housing 406 when inserted within the metal shield 406**.

The rearward face 622 of the second housing 404 frames a rear projection 630 that is sized to be received within the rear cavity 430 of the first housing 402. The rear projection 630 includes first and second channels 632, 634 that receives the rearward contacts **408*b* of the pair of contacts 408 to allowing them to pass through to the forward cavity 624. The channels 632, 634 on the rear projection 630 include openings that are sized to receive the central portion 408*c* of each of the pair of contacts 408. A stop 635 is formed within each of the channels 632, 634 to prevent over-insertion of the rearward contact 408*b* of the pair of contact 408**.

Further, each of channels 632, 634 is formed to include a retention notch 637 that interfaces with a tang **408*d* on each of the pair of contacts 408. The interface of the retention notch 637 and tang 408*d* ensures a correctly-oriented and fixed position for each of the contacts 408. Each side of the rear projection 630 includes a hooked tab 636 that interfaces with the flanged edge 444 of the first housing to mechanically couple the first housing 402 to the second housing. A rear wall 638 separate the forward cavity 624 from the rear projection 630**.

Each of the side walls 614, 616 of the second housing includes an elongate opening 640 that receives a flex tab 728 of the metal shield 406 that retains the second housing 404 within the metal shield 406; the flex tab 728 extends into the forward cavity 624 to make contact with the metal frame 204 of a connector 200 that is received therein.

Figure 7A:
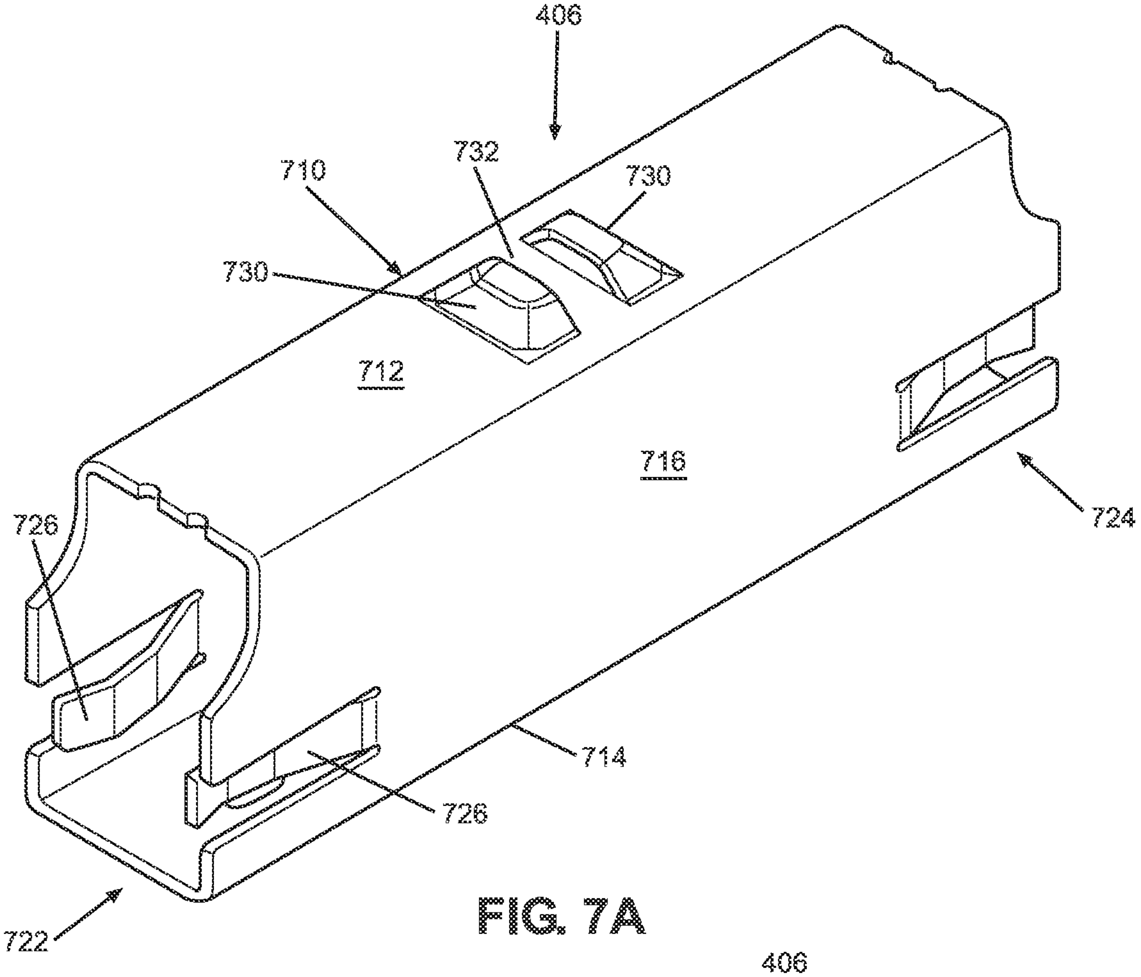
FIGS. 7A-7B provide a side perspective and front perspective view of a metal shield of the coupler of FIGS. 4A-4B.
Figure 7B:
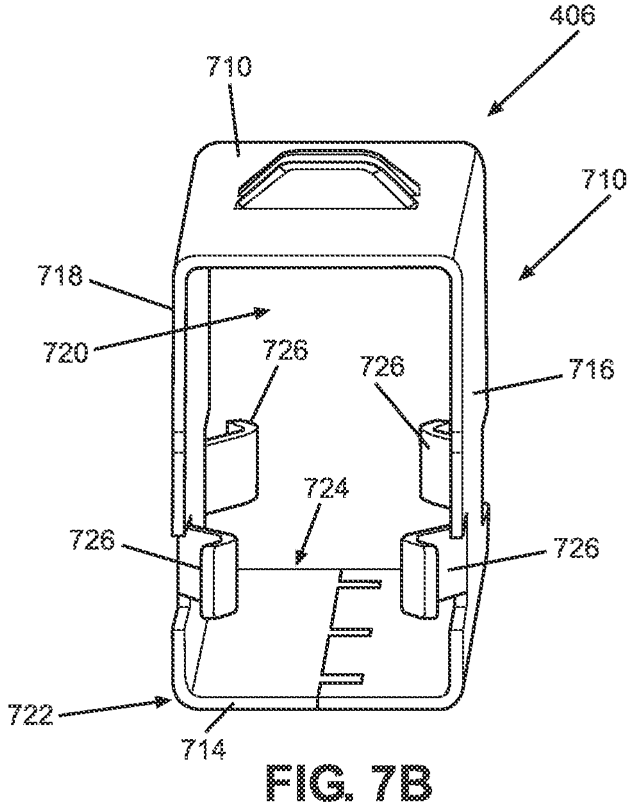

FIGS. 7A-7B further illustrate the details of the metal shield 406. As shown, the metal shield 406 generally comprises a singular housing 710 having an upper face 712 and a lower face 714 connected by side faces 716,718 that define a central channel 720 extending there through. The housing 710 includes a first end 722 that receives the first housing 402 and a second end 724 that receives the second housing 404. Each of the side walls 716, 718 at the first end 722 of the housing 710 includes a pair of opposed flex tabs 726 that are received within the first elongate opening 440 of each of the side faces 414, 416 of the first housing 402. Each of the side walls 716,718 at the second end 724 of the housing 710 includes another pair of opposed flex tabs 728 that are received within the elongate opening 640 of each of the side walls 614, 616 of the second housing 404. The pairs of flex tabs 726, 728 flex outward to receive the respective housing 402, 404 and flex inward to retain each of the housings 402, 404 therein. The inward flexing of the flex tabs 726, 728 additionally provides contact between the flex tabs 726, 728 and the metal tabs 242 of the metal frame 204 of the connector 200 that is received within each of the first housing 402 and the second housing 404.

Figure 8:
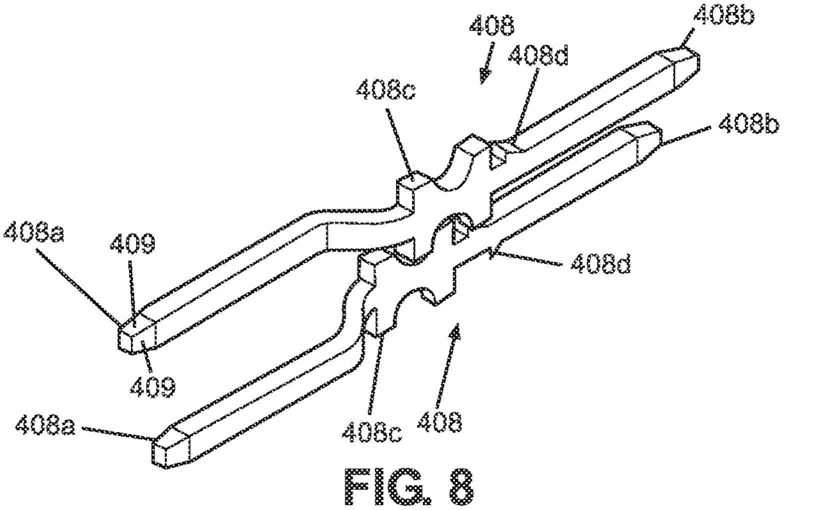
FIG. 8 is a perspective view of a pair of contacts of the coupler of FIGS. 4A-4B.

The top face 712 of the metal shield 406 presents a pair of opposing bosses 730 that extend away from the top face 712. The pair of opposing bosses 730 define a central open channel 732. The bosses 730 and the open channel 732 present an interface that is used to secure the position of the coupler 400 in a high density panel. In certain embodiments, the metal shield 406 is manufactured through use of a sheet metal stamping process wherein the resulting stamped component is subsequently formed into the illustrated metal shield 406. It should be noted that in certain non-shielding applications that metal shield 406 can, alternatively, be fabricated from non-metal materials FIG. 8 provides a closer perspective view of the pair of contacts 408. Each of the contacts 408 includes a forward contact **408*a* and rearward contact 408*b* separated by a central portion 408*c*. A tang 408*d* is provided on each of the contacts 408 to secure positioning of the contact 408 within the second housing 404. Each of the forward and rearward contacts 408***a*, 408*b* are pin contacts having a square or rectangular cross-section wherein the end of the pin includes four tapered faces 409 that form a four-sided pyramid shape with a flattened apex 411. In certain embodiments, the pins are of a rounded configuration. Notably the contacts 408 are offset from one another to help prevent alien crosstalk between couplers 400 and connectors 200 in high density application. Further, the forward contacts 408*a* are configured in a cross-over configuration to maintain polarity between the two connectors 200 when electrically coupled with the contacts 408.

Manufacturing the coupler 400 includes inserting the first housing 402 into the first end 722 of the metal shield 406. The rearward contacts 408*b* of the pair of contacts 408 are inserted into the first and second channels 632, 634 (see FIG. 6C) of the second housing 404 until secured in position by tangs 408*d*. The second housing 404, with forward contacts 408*a* extending there from, is inserted into the second end 724 of the metal shield 406 and further inserted into the rear cavity of the first housing 402. The forward contacts 408*a* are received within the first and second channels of 434, 436 (see FIG. 5C) of the first housing 402 until pushed there through and the hooked tabs 636 (see FIG. 6A) of the second housing 404 pass then engage the flanged edge 444 (see FIG. 5C) of the first housing 402 thereby mechanically coupling the first housing 402 to the second housing 404. Flex tabs 726 of the metal shield 406 receive and retain the first and second housings 402, 404 within the metal shield 406.

Figure 9A:
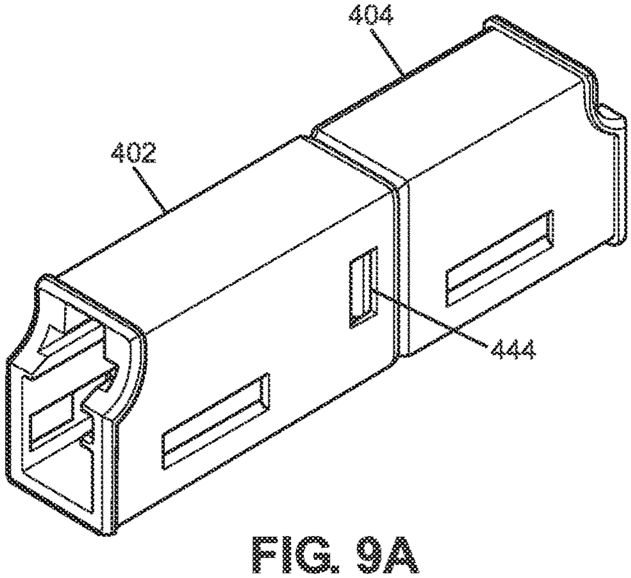
FIGS. 9A-9B provide perspective view of the first and second housings coupled.
Figure 9B:
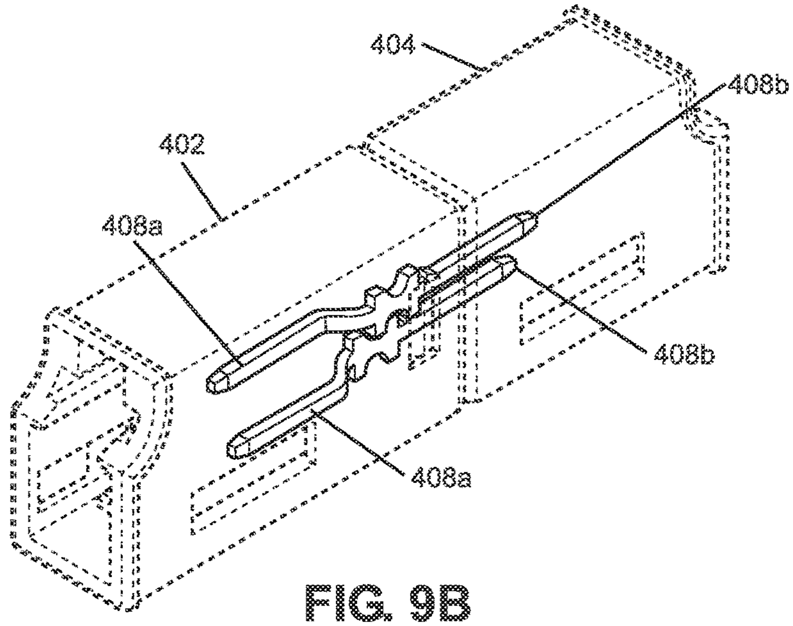
Figure 10A:
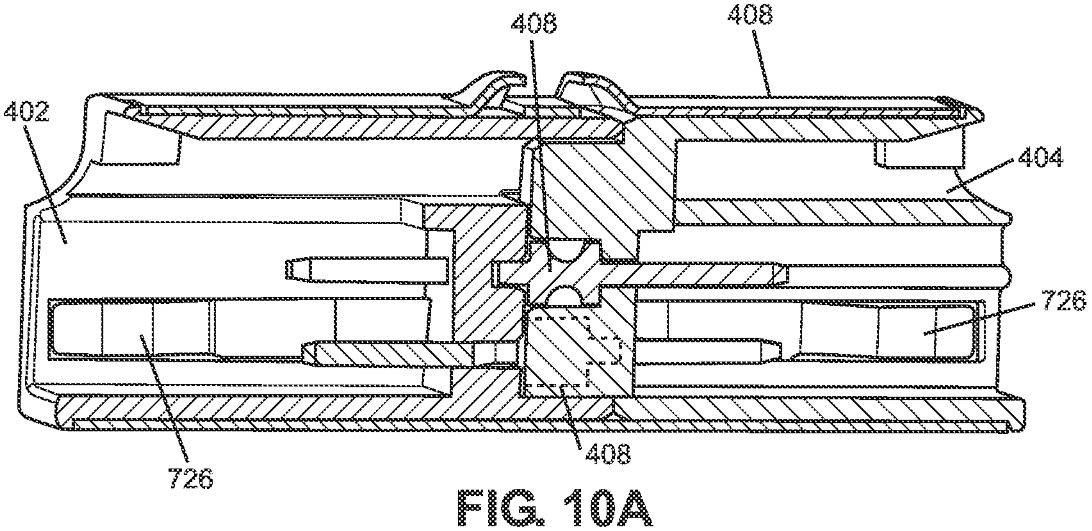
FIGS. 10A-10B provide cross-sectional views of the assembled coupler of FIG. 4A.
Figure 10B:
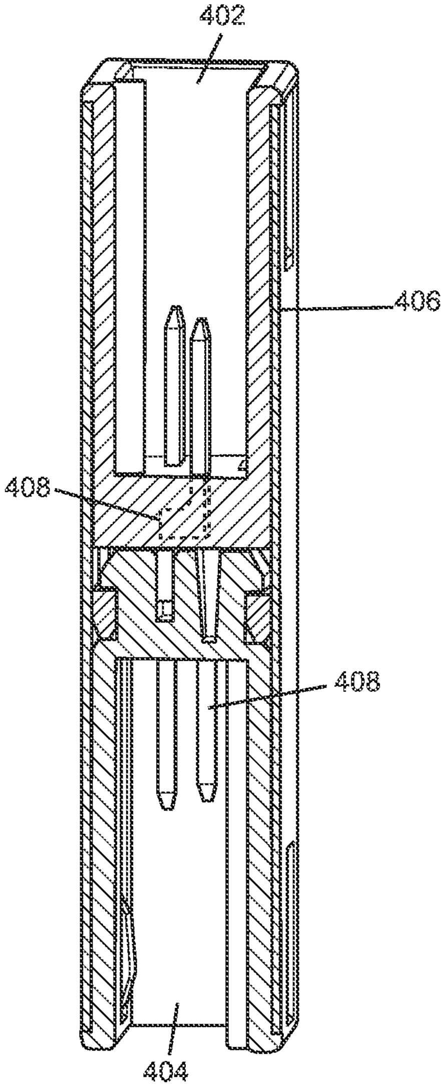
Figure 11A:
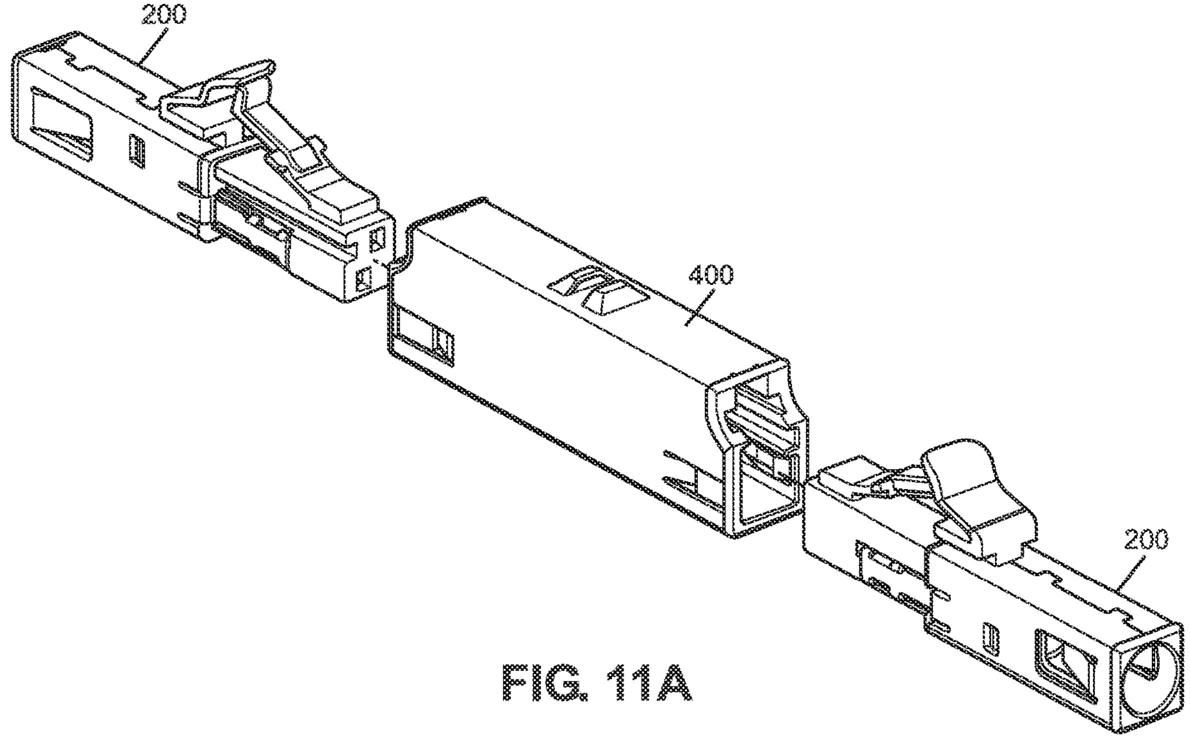
FIGS. 11A-11B provide perspective views of the coupler of FIGS. 4A-4B and two of the free connectors of FIGS. 2A-2D.
Figure 11B:
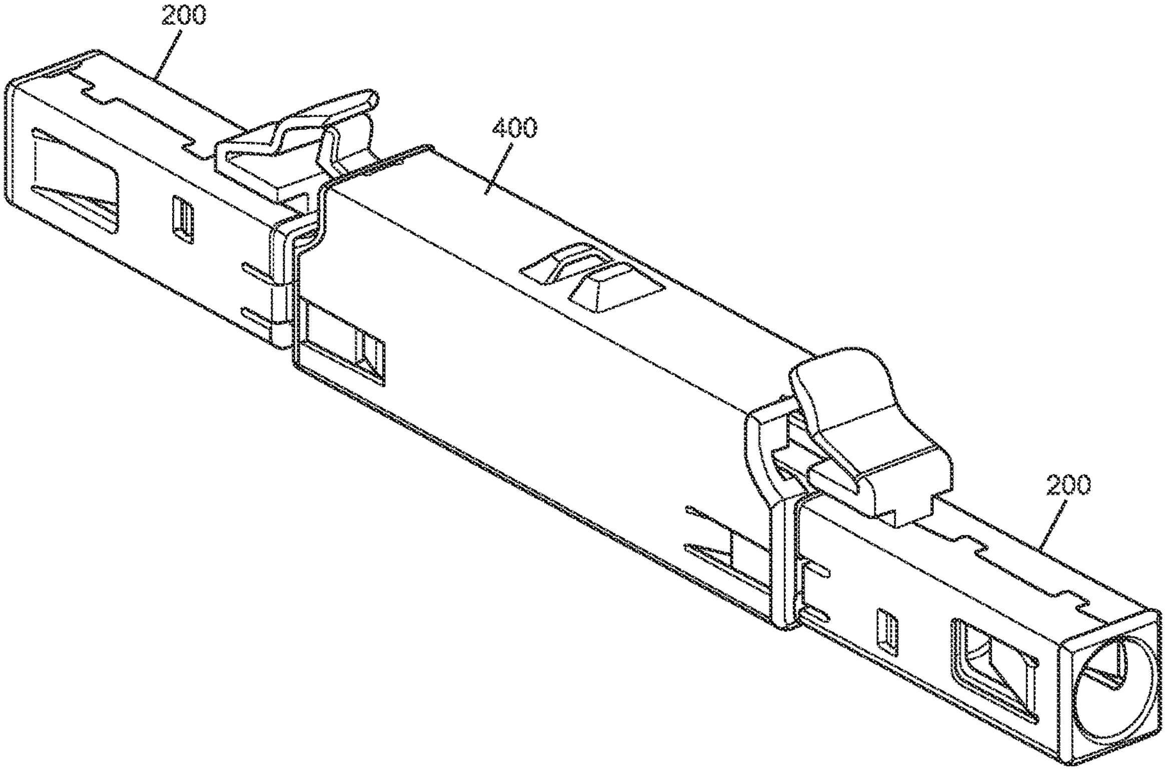

FIGS. 9A and 9B illustrate the first and second housings 402, 404 coupled to one another, absent the metal shield 406, with FIG. 9B illustrating the position of the pair of contacts 908 within the coupled first and second housings 402, 404. FIGS. 10A and 10B provide cross-sectional views of the assembled coupler, including the metal shield 406, taken along lines 10A-10A and 10B-10B, respectively, of FIG. 4A, with each illustrating the placement of the first housing 402, the second housing 404, the metal shield 406 and the pair of contacts 408. FIGS. 11A and 11B illustrate the assembled coupler 400 with two of the free connectors 200 ready to be received by the coupler 400 and with the two connectors 200 removably received within the coupler 400 and electrically coupled, respectively.

Figure 12A:
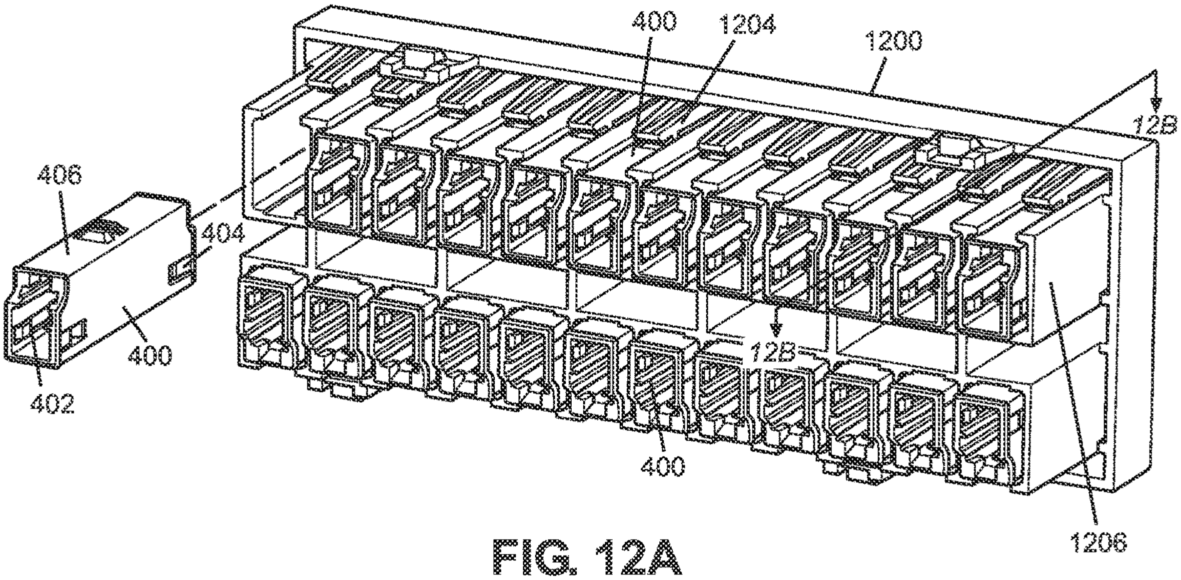
FIGS. 12A-12B illustrate an example configuration of a high density panel maintaining a plurality of couplers with each coupler capable of electrically coupling two free connectors.
Figure 12B:
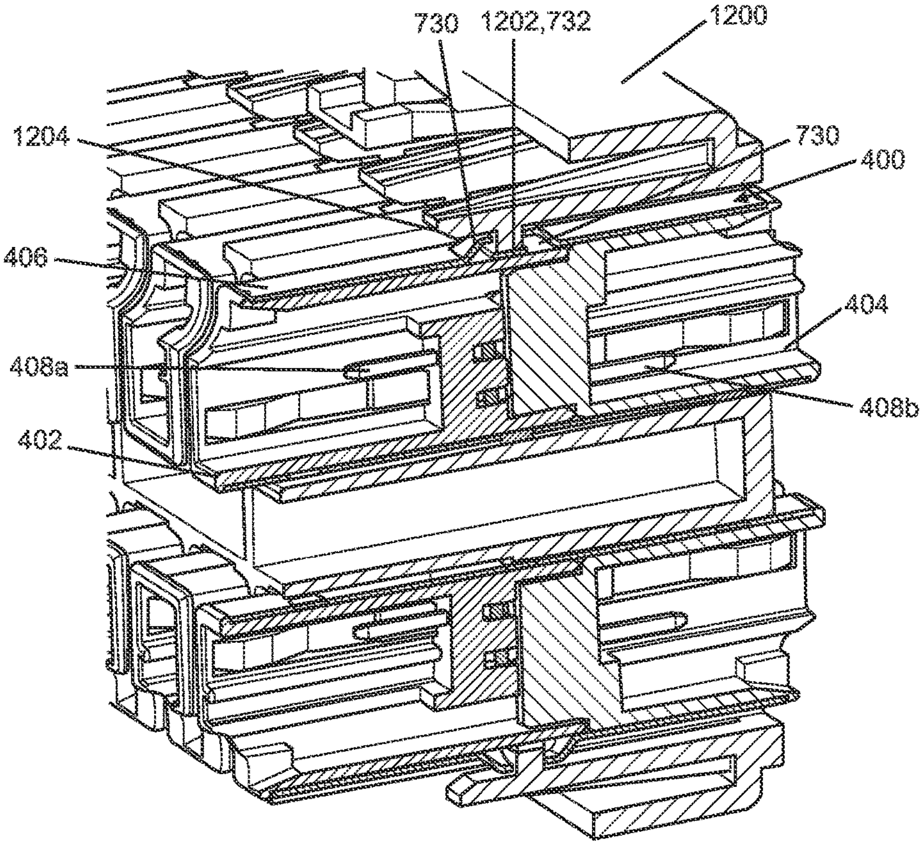
Figure 13A:
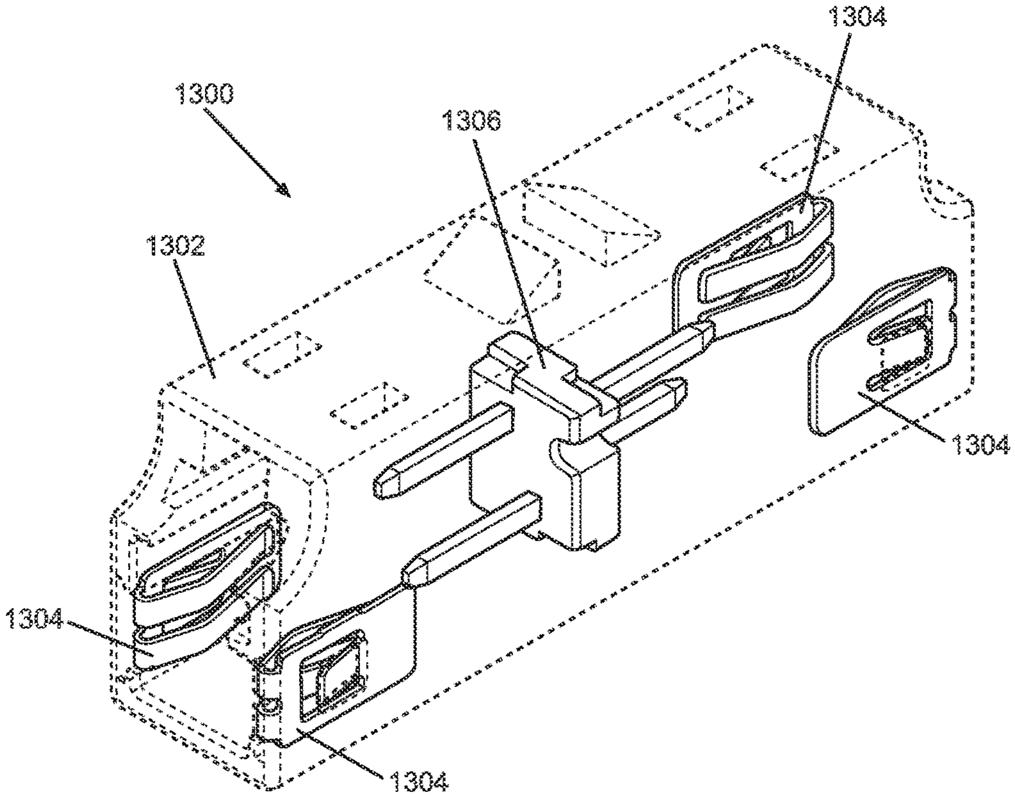
FIGS. 13A-13D illustrate an embodiment of a shielded coupler including a shadowed side perspective, a side perspective, a front/rear perspective (without contacts) and a front/rear perspective of the coupler (with contacts).
Figure 13B:
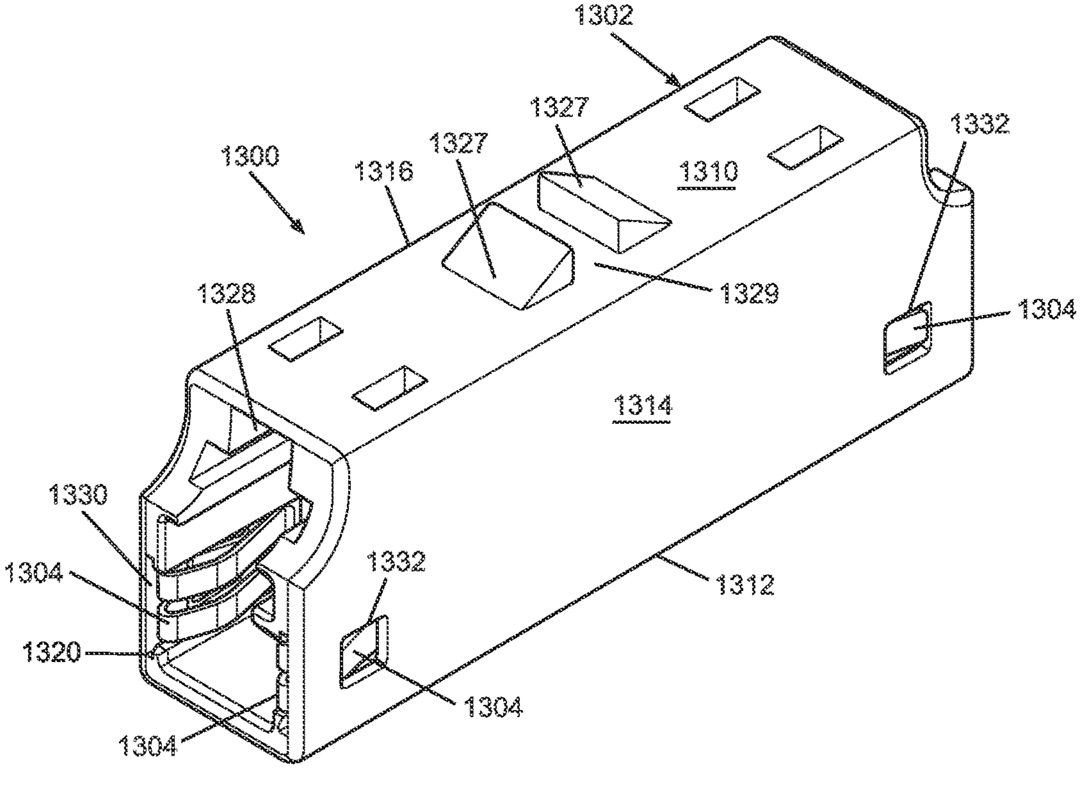
Figure 13D:
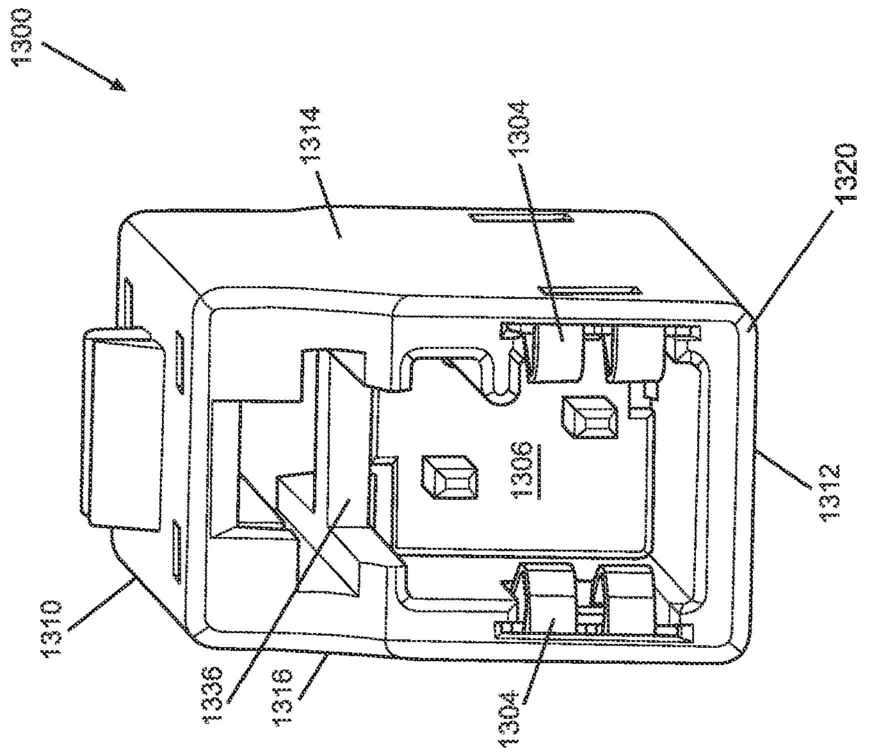
Figure 13C:
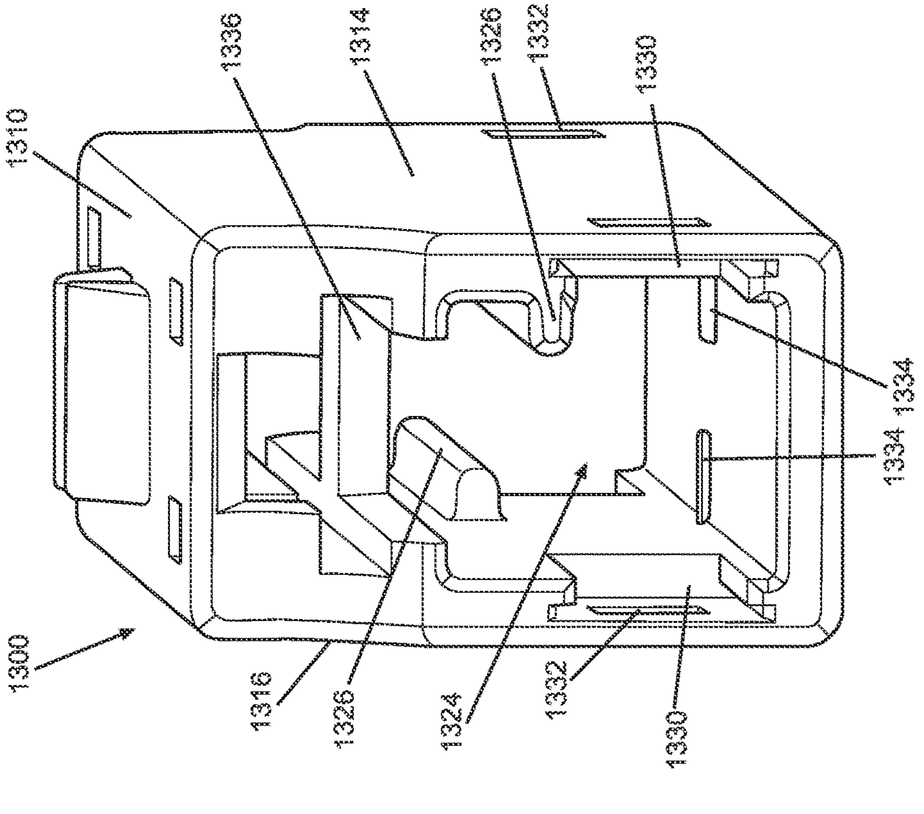

FIGS. 12A-12B illustrate an example embodiment of a high density panel 1200, which can be shielded or non-shielded, that supports a plurality of couplers 400. Each of the couplers 400 serves to electrically couple two free connectors 200. FIG. 12B illustrates the interface between the bosses 730/channel 732 of the metal shield 406 and a retaining element 1202 of a flex arm 1204 of the high density panel 1200 that retains the coupler 400 in a desired position within a coupler slot 1206.

FIGS. 13A-13D illustrate another example embodiment of a shielded coupler 1300. The coupler 1300 includes a singular metal housing 1302, four bonding shield contacts 1304 and a contact sub-assembly 1306.

The housing 1302, which is typically die cast, includes an upper face 1310 and a lower face 1312 connected by a first side face 1314 and a second side face 1316 that, together, define identical first and second end faces 1320, 1322. The first and second end faces 1320, 1322 surrounds a central cavity 1324 that extends the length of the coupler 1300. In certain embodiments, a projection 1326 projects from one, or more, of the faces 1314, 1316, 1320, 1322 into the central cavity 1324 to align a connector 200 for insertion and/or prevent a non-compatible connector from being inserted therein. Each of the first and second end faces 1320, 1322 further defines a recessed notch 1328 that is configured to interface with and retain the cantilevered latch 230 of the connector 200. The upper face 1310 of the housing includes first and second bosses 1327 that extend away from the upper face and oppose one another to define a channel 1329 there between.

The interior of each of the first and second side faces 1314, 1316 includes two recesses 1330, e.g., a total of four recesses 1330, each of which receives one of the four bonding shield contacts 1304, which are press fit therein. Proximate each of the recesses 1330 is an opening 1332 that extends through the respective side face 1314, 1316. Each of the openings 1332 interfaces with an outward extending prong 1418 (see FIG. 14B) of the bonding shield contact 1304 to assist in maintaining the position of the bonding shield contact 1304 relative to the housing 1302. An interior surface of the lower face 1312 includes first and second ramped projections 1334 (e.g., ramped in opposite directions) that interface with the contact sub-assembly 1306 to assist in maintaining the contact sub-assembly 1306 in a central position within the central cavity 1324. A cross-component 1336 extends between the interior surfaces of the first and second side walls 1314, 1316 and presents corresponding first and second ramped projections 1338 (see FIG. 16A) that are ramped in opposite directions (and are ramped in opposite direction to the projection 1334 immediately below). Projections 1338 also interface with the contact sub-assembly 1306 to assist in maintaining the contact sub-assembly 1306 in a central position within the central cavity 1324.

Figure 14A:
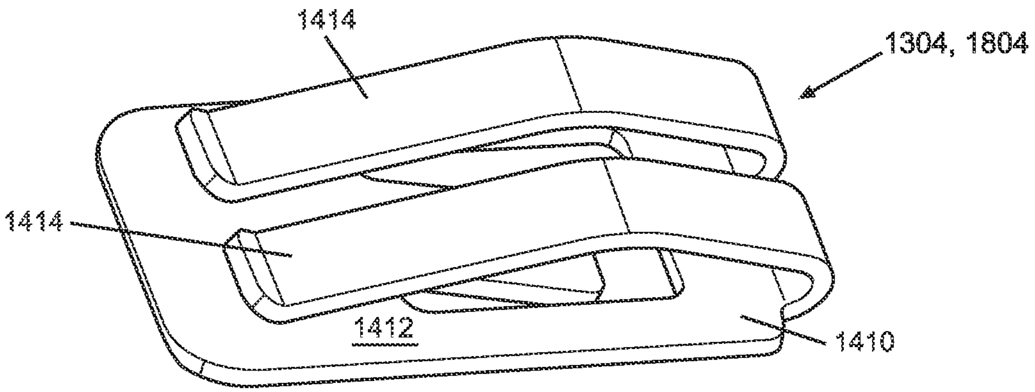
FIGS. 14A-14C illustrate an embodiment of a bonding shield contact of the coupler of FIGS. 13A-13D including a top perspective, bottom perspective and side view of the bonding shield contact.
Figure 14B:
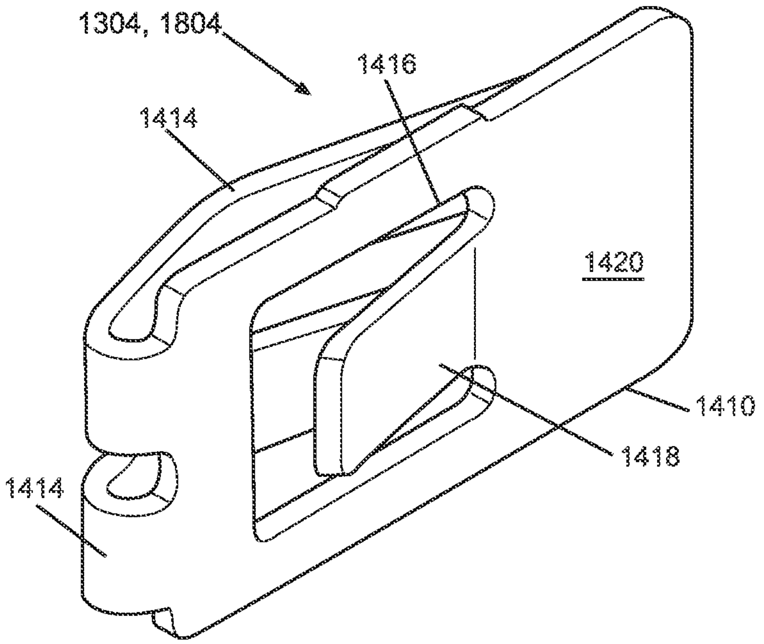
Figure 14C:
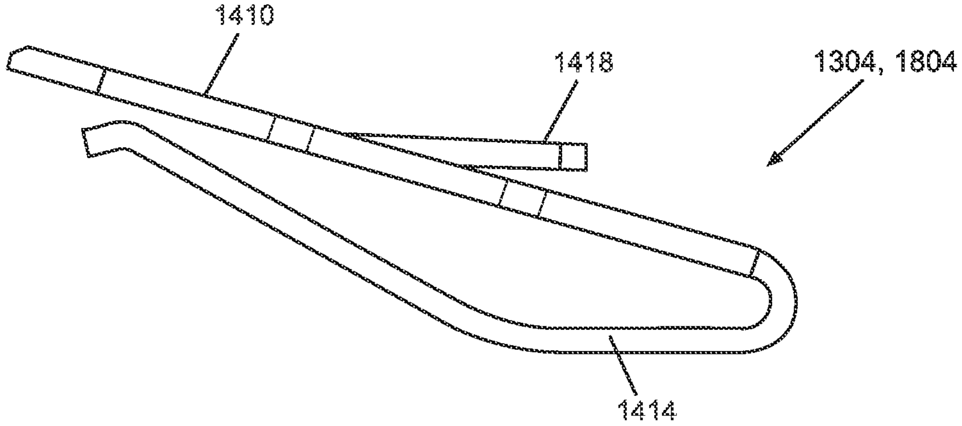

Further details of the metal bonding shield contacts 1304 can be appreciated with respect to FIGS. 14A-14C. As shown, each of the bonding shield contacts 1304 includes a base plate 1410 from which extend a pair of flex arms 1414 and fold over an upper surface 1412 of the base plate 1410. When in position within the housing 1302, one or both of metal flex arms 1414 will contact one of the metal flex tabs 242 of the metal frame 202 of the free connector 200 (see FIG. 2B) that is received within the housing 1302. An opening 1416 in the base plate 1410 accommodates a prong 1418 that extends outward and away from a bottom surface 1420 of the base plate 1410. The prong 1418 interfaces with the respective opening 1332 in the side faces 1314, 1316 to assist in maintaining the position of the bonding shield contact 1304.

Figure 15A:
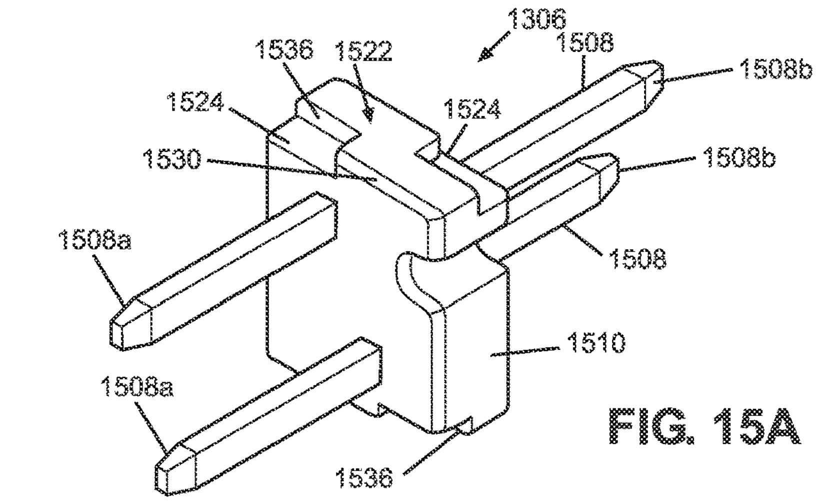
FIGS. 15A-15C provide perspective views of an embodiment of a contact sub-assembly of the coupler of FIGS. 13A-13D.
Figure 15B:
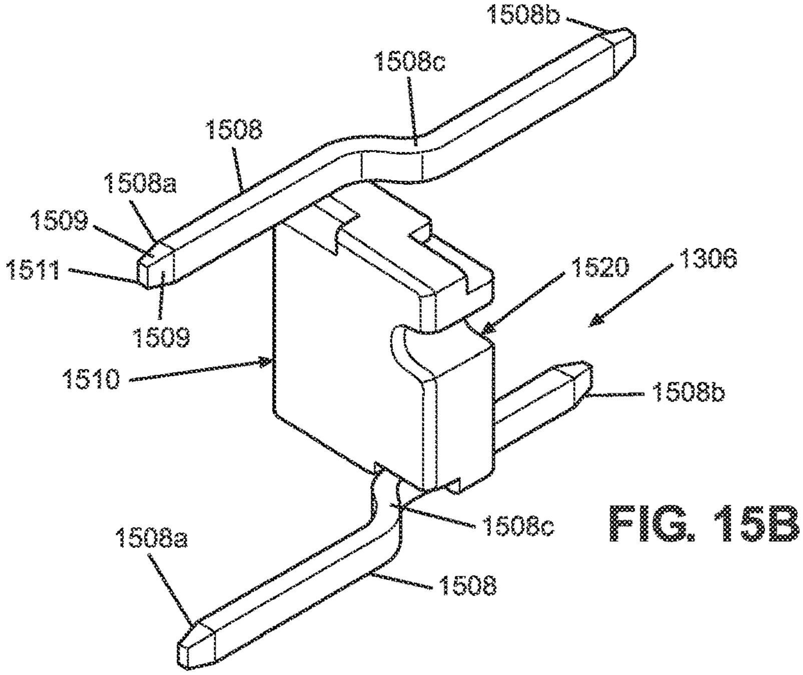
Figure 15C:
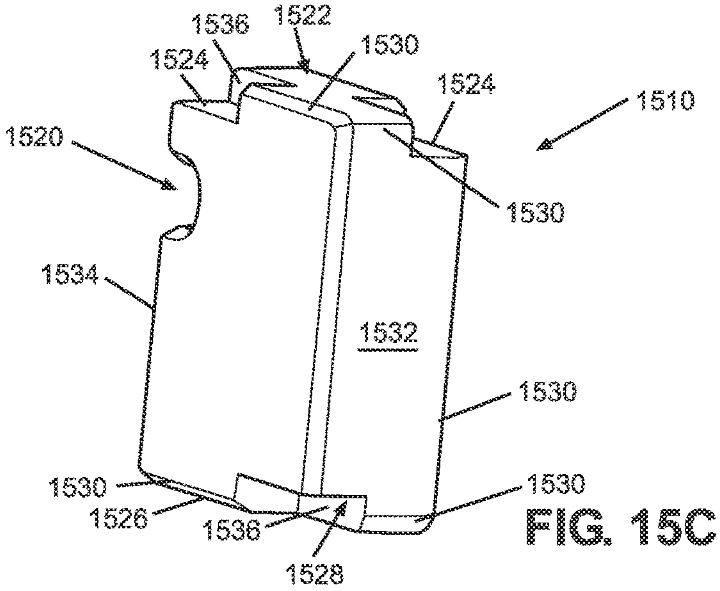

Further details of the contact sub-assembly 1306 can be appreciated with respect to FIGS. 15A-15C. As shown, the sub-assembly 1306 includes a pair of contacts 1508, similar to contacts 408 (see FIG. 8), over molded with a block 1510. As with contacts 408, each of contacts 1508 includes a forward contact 1508*a*, a rearward contact 1508*b*, and a central portion 1508*c*. Each of the forward and rearward contacts 1508*a*, 1508*b* are pin contacts having a square or rectangular cross-section wherein the end of the pin includes four tapered faces 1509 that form a four-sided pyramid shape with a flattened apex 1511. In certain embodiments, the pins are of a rounded configuration. Notably the contacts 1508 are offset from one another to help prevent alien crosstalk between couplers 1300 and connectors 200 in high density applications. Further, the forward contacts 1508*a* are configured in a cross-over configuration to maintain polarity between the two connectors 200 when electrically coupled with the contacts 1508.

The block 1510 of the contact sub-assembly 1306 includes a side channel 1520 to accommodate the projection 1326 within the central cavity 1324 of the housing 1302. An upper face 1522 of the block 1510 includes recessed first and second corners 1524 that are positioned diagonal to one another. A lower face 1526 of the block 1510 includes first and second recessed corner 1528 that are positioned diagonal to one another and are opposite corners to first and second corners 1524. Edges 1530 surrounding each of the upper face 1522 and lower face 1526, as well as side walls 1532, 1534, of the block 1510 are beveled for easier insertion of the sub-assembly 1306 within the housing 1302 of the coupler 1300. The block 1510, when inserted within the housing 1302, is slid past the ramped projections 1334, 1338 of the housing 1302 into a central position whereby the ramped projections 1334, 338 interface with a wall 1536 that defines that defines each of the recessed corners 1524, 1528.

Figure 16A:
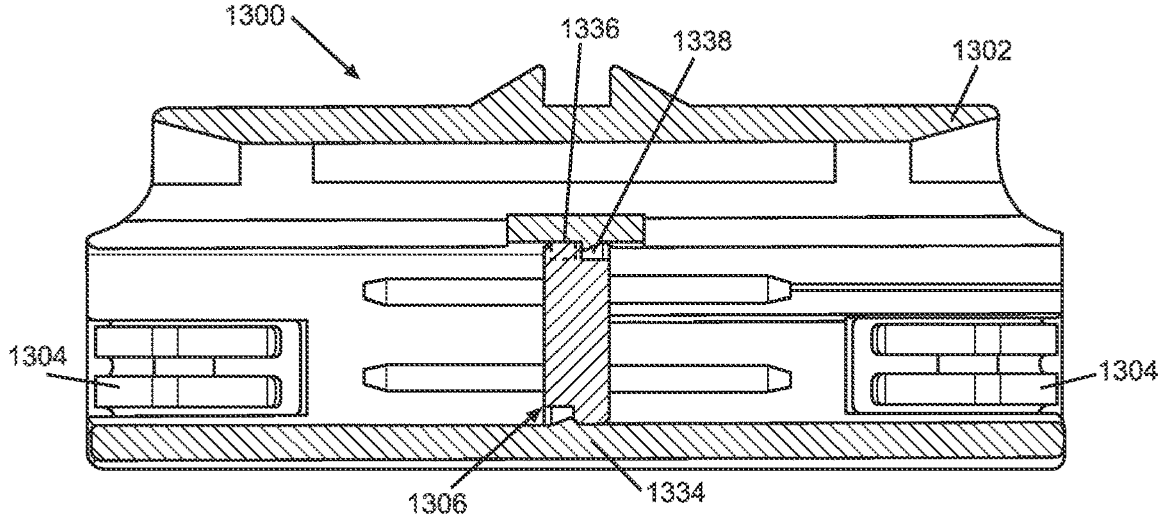
FIGS. 16A-16B are cross-sectional views of the coupler of FIGS. 13A-13D taken along lines 16A-16A and 16B-16B of FIG. 17, respectively.
Figure 16B:
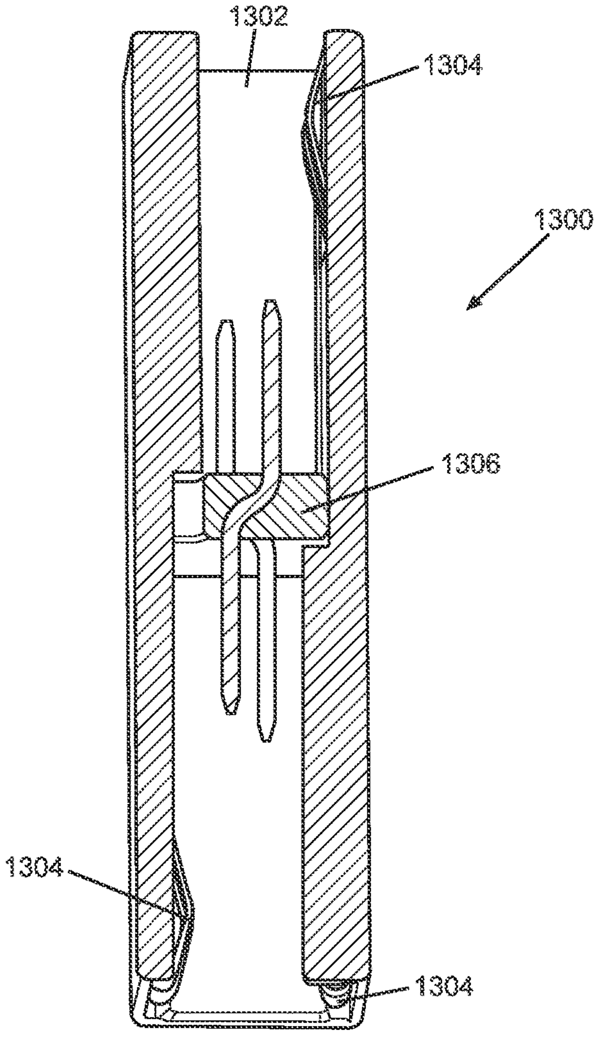
Figure 17:
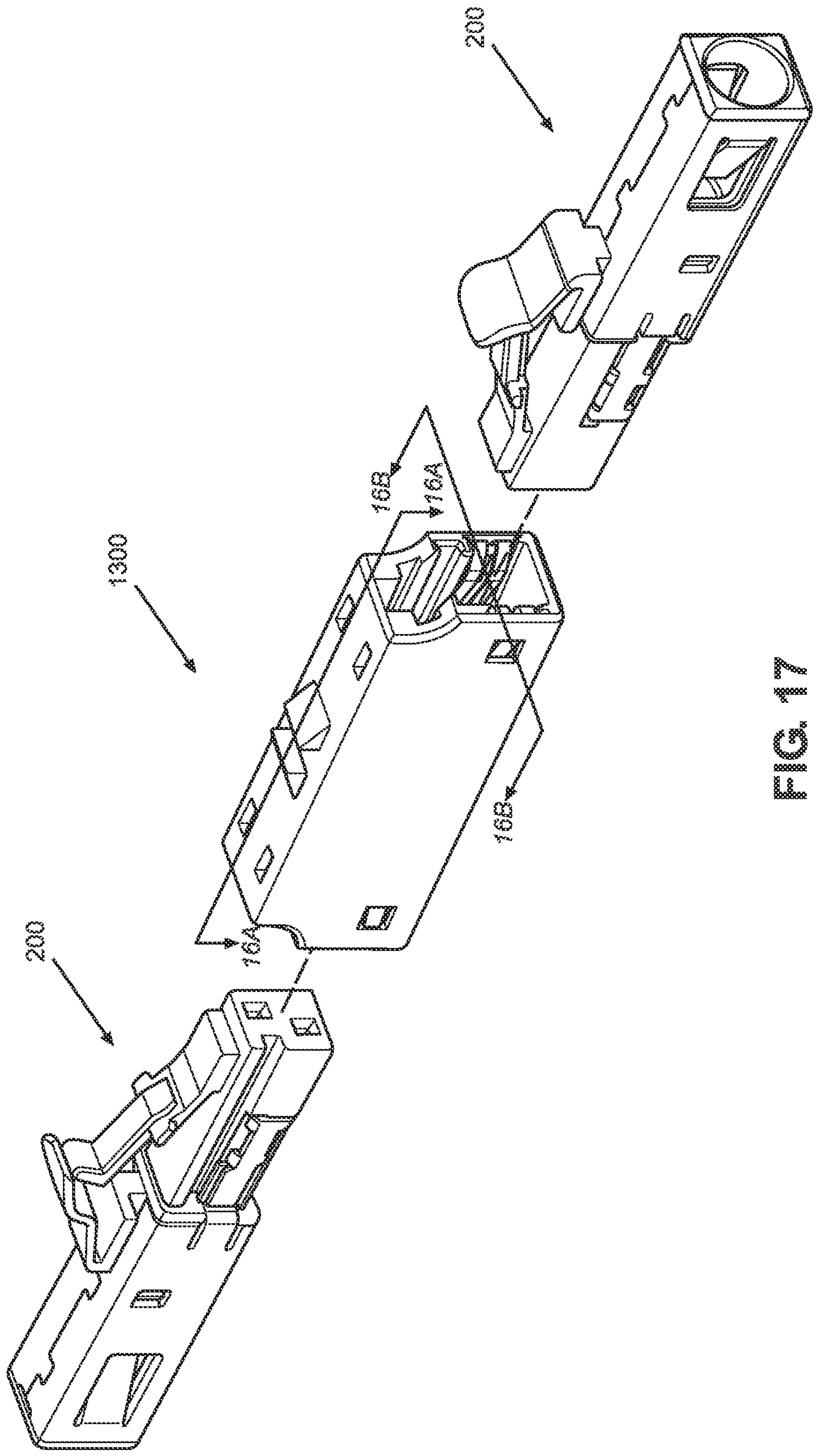
FIG. 17 is a perspective view of the coupler of FIGS. 13A-13D receiving first and second free connectors of FIGS. 2A-2D.
Figure 18:
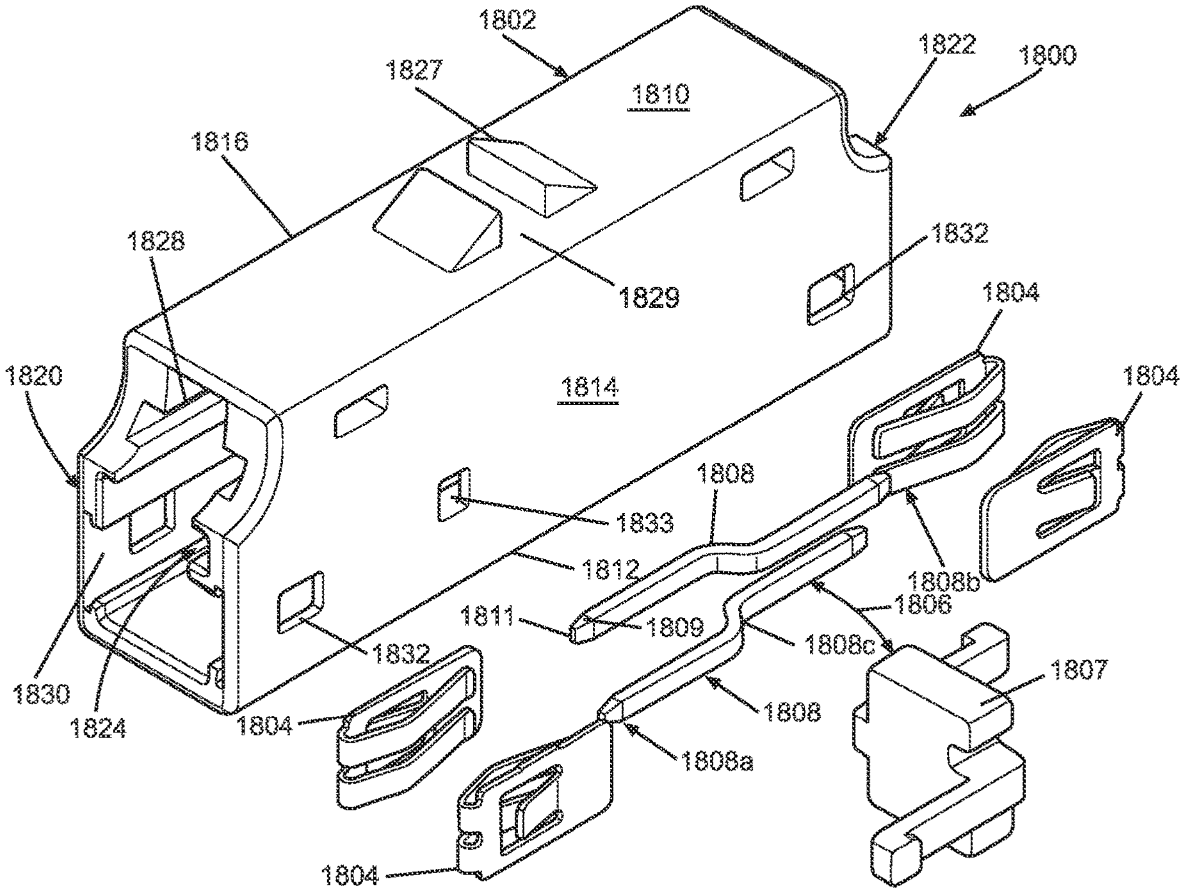
FIG. 18 illustrates an exploded perspective view of an embodiment of a coupler.
Figure 19:
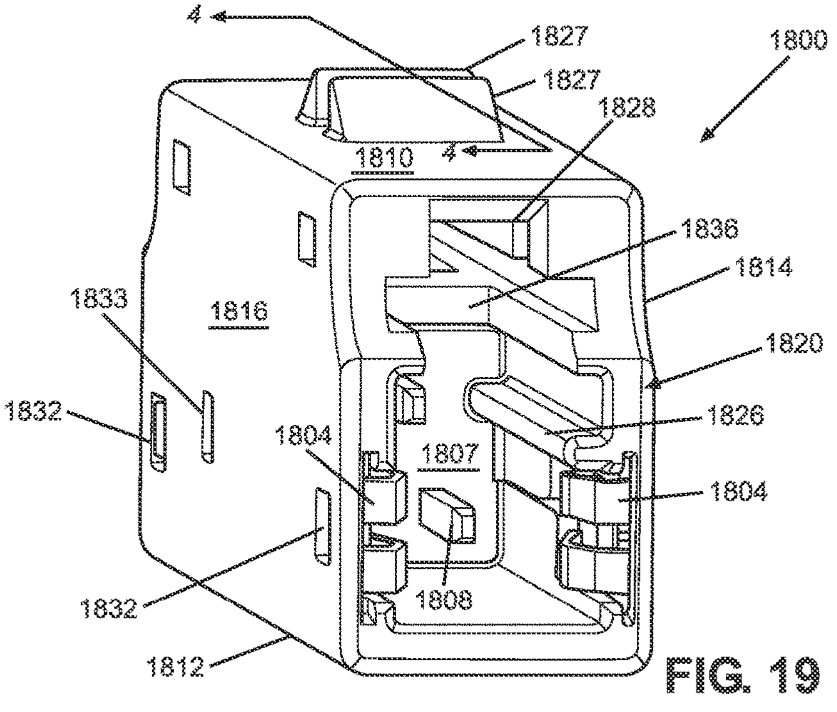
FIG. 19 is a perspective view coupler of FIG. 18 in an assembled configuration.
Figure 20:
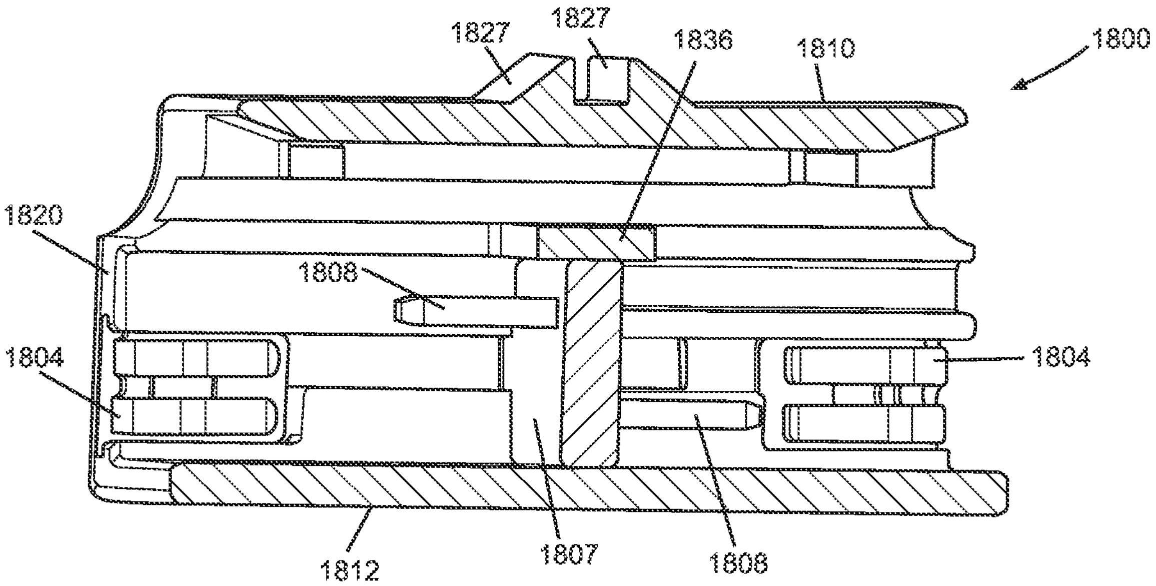
FIG. 20 is a cross-sectional view of the coupler of FIG. 19 taken along line A-A.

FIGS. 16A-16B provide a side cross-sectional view and top cross-sectional view taken along lines 16A-16A and 16B-16B of FIG. 17, respectively. Each cross-section illustrates the housing 1302, bonding shield contacts 1304 and contact sub-assembly relative to one another in a fully assembled coupler 1300. FIG. 17 illustrates the coupler 1300 receiving a first free connector 200 and a second free connector 200. As with coupler 400, a plurality of couplers 1300 can be utilized in a high density panel 1200 (see FIGS. 12A-12B).

FIGS. 18, 19, 20 and 21A-21B illustrate another example embodiment of a coupler 1800 in a shielded configuration. The coupler 1800 includes a singular metal housing 1802, four bonding shield contacts 1804 and a contact sub-assembly 1806 that includes a body 1807 and a single pair of contacts 1808.

The housing 1802, which is die cast in a symmetrical configuration, includes an upper face 1810 and a lower face 1812 connected by a first side face 1814 and a second side face 1816 that, together, define identical first and second end faces 1820, 1822. The first and second faces 1820, 1822 surround a central cavity 1824 that extends the length of the coupler 1800 between first and second end face 1820, 1822. In certain embodiments, a projection 1826 projects from one, or more, of the faces 1814, 1816, 1820, 1822 into the central cavity 1824 to align a connector 200 for insertion and/or prevent a non-compatible connector from being inserted therein. Each of the first and second end faces 1820, 1822 further defines a recessed notch 1828 that is configured to interface with and retain the cantilevered latch 230 of the connector 200. The upper face 1810 of the housing includes first and second bosses 1827 that extend away from the upper face and oppose one another to define a channel 1829 there between.

The interior of each of the first and second side faces 1814, 1816 includes two recesses 1830, e.g., a total of four recesses 1830, each of which receives one of the four bonding shield contacts 1804, which are press fit therein. Proximate each of the recesses 1830 is an opening 1832 that extends through the respective side face 1814, 1816. Each of the openings 1832 interfaces with an outward extending prong 1418 (see FIG. 14B) of the bonding shield contact 1804 to assist in maintaining the position of the bonding shield contact 1804 relative to the housing 1802. Additional details regarding the bonding shield contacts 1804 can be found with reference to FIGS. 14A-14C. Each of the side faces 1814, 1816 additionally includes an opening 1833 to interface with the contact sub-assembly 1806.

As previously noted, the contact sub-assembly 1806 includes pair of contacts 1808, which generally correspond to contacts 408 (see FIG. 8). As with contacts 408, each of contacts 1808 (see FIG. 18) includes a forward contact 1808*a*, a rearward contact 1808*b*, and a central portion 1808*c*. Each of the forward and rearward contacts 1808*a*, 1808*b* are pin contacts having a square or rectangular cross-section wherein the end of the pin includes four tapered faces 1809 that form a four-sided pyramid shape with a flattened apex 1811. In certain embodiments, the pins are of a rounded configuration. Notably the contacts 1808 are offset from one another to help prevent alien crosstalk between couplers 1800 and connectors 200 in high density applications. Further, the forward contacts 1808*a* are configured in a cross-over configuration to maintain polarity between the two connectors 200 when electrically coupled with the contacts 1808.

Figure 21A:
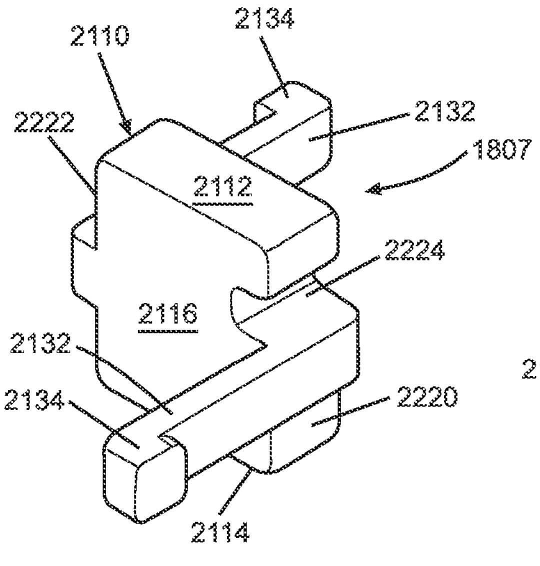
FIGS. 21A-21B are perspective views of a body portion of a contact sub-assembly.
Figure 21B:
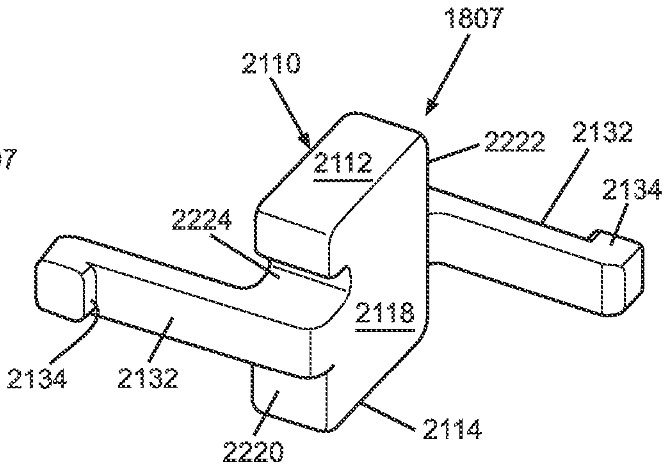

Further details of the body 1807 of the contact sub-assembly 1806 can be appreciated with respect to FIGS. 21A-21B. As shown, the symmetrical body 1807 of the contact sub-assembly 1806 includes a central block portion 2110 that includes an upper face 2112 opposing a lower face 2114 with the upper and lower faces 2112, 2114 connected by first and second broad side faces 2116, 2118 and by first and second narrow side faces 2220, 2222. The first narrow side face 2220 incorporates a channel 2224 to accommodate the projection 1826 within the central cavity 1824 of the housing 1802. All edges 2130 of the plurality of faces 2110-2222 of the central block portion 2110 are beveled for easier insertion of the sub-assembly 1806 within the housing 1802 of the coupler 1800. First and second latch arms 2132, extend from the approximate center of each of first and second narrow side faces 2220, 2222, with each of the first and second latch arms 2132 including a corresponding lip edge 2134 to interface with opening 1833 in a respective one of the first and second side walls 1814, 1816 of the housing 1802 of the coupler 1800. Each of the latch arms 2132 flexes relative to the central block portion 2110 of the body 1807 to enable insertion of the contact sub-assembly 1806 whereby the interfacing of the lip edge 2134 and coupler opening 1833 removably retains the contact sub-assembly 1806 within the coupler 1800. The symmetrical configuration of the body 1807 of the contact sub-assembly 1806, along with symmetrical configuration of the coupler housing 1802, enables the contact sub-assembly 1806 to be inserted into the housing 1802 via either the first end face 1820 or the second end face 1822 of the housing 1802.

In order to ensure shielding properties of the coupler 1800, the housing 1802 of the coupler 1800 is preferably die cast metal (e.g., a zinc alloy) to provide shielding, grounding and bonding paths with bonding shield contacts 1804 and connectors 200 received via the first and second end faces 1820, 1822 of the housing 1802 of the coupler 1800. The single pair of contacts 1808 provide a signal and/or power path from a first connector 200 to a second connector 200 that are received within the coupler 1800. The single pair of contacts 1808 are held in position by the central block portion 2110 of the body 1807 of the contact sub-assembly 1806.

Figure 22:
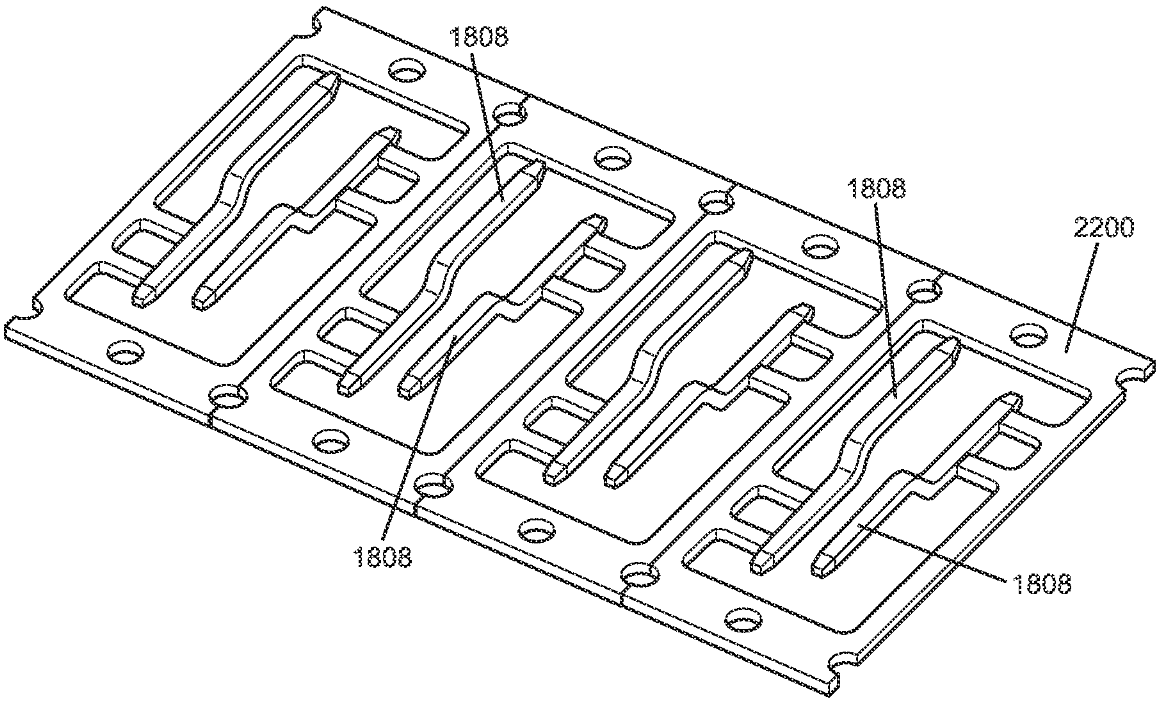
FIGS. 22-23 illustrate steps in manufacturing a contact sub-assembly.
Figure 23:
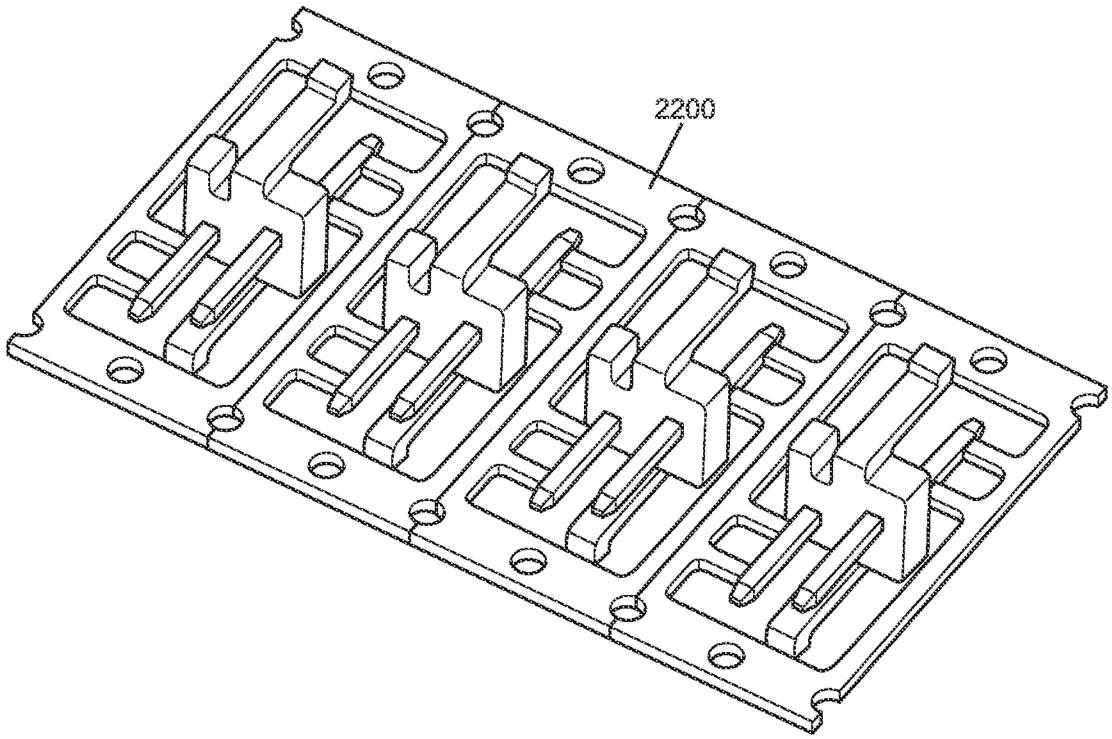

FIGS. 22-23 illustrate an example of a method of manufacture of the contact sub-assembly 1806 using a carrier strip 2200. Per FIG. 22, each section of the carrier strip 2200 is progressively die stamped to form the pair of contacts 1808. Subsequently, per FIG. 23, each of section of the carrier strip 2200 is subjected to injection over molding (using, for example, a plastic or other moldable material) to form the body 1807 of the contact sub-assembly 1806 about the contacts 1808. The contact sub-assembly 1806 can then be removed from each respective section of the carrier strip 2200 and inserted into the housing 1802 of the coupler 1800.

As with the other coupler embodiments disclosed herein, the shielded coupler 1800 can also be manufactured in an unshielded configuration by eliminating the bonding shield contacts 1804 and manufacturing the housing from a non-conductive material (e.g., a plastic).

Figure 24:
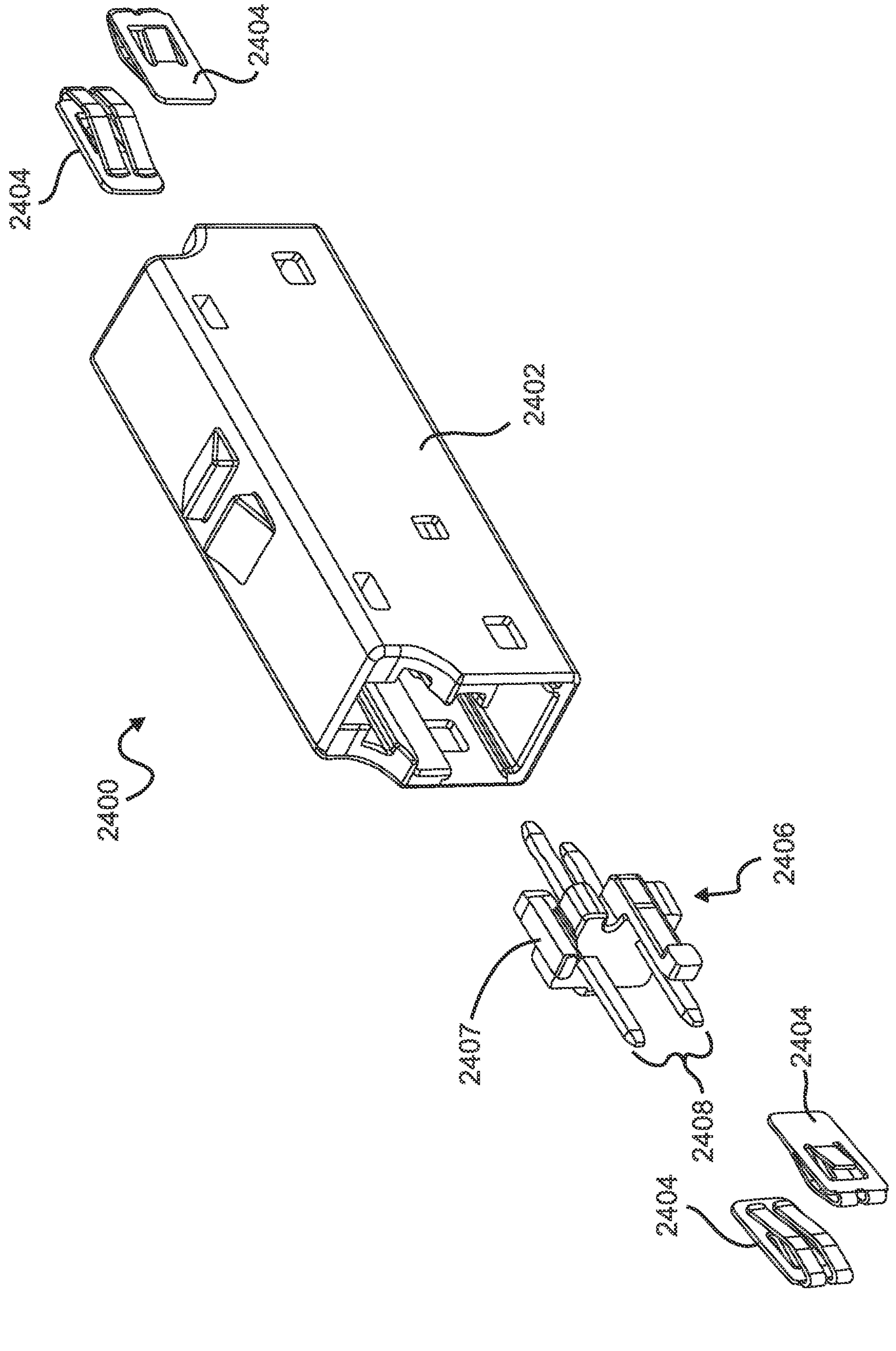
FIG. 24 is an exploded perspective view of an embodiment of a coupler.
Figure 25:
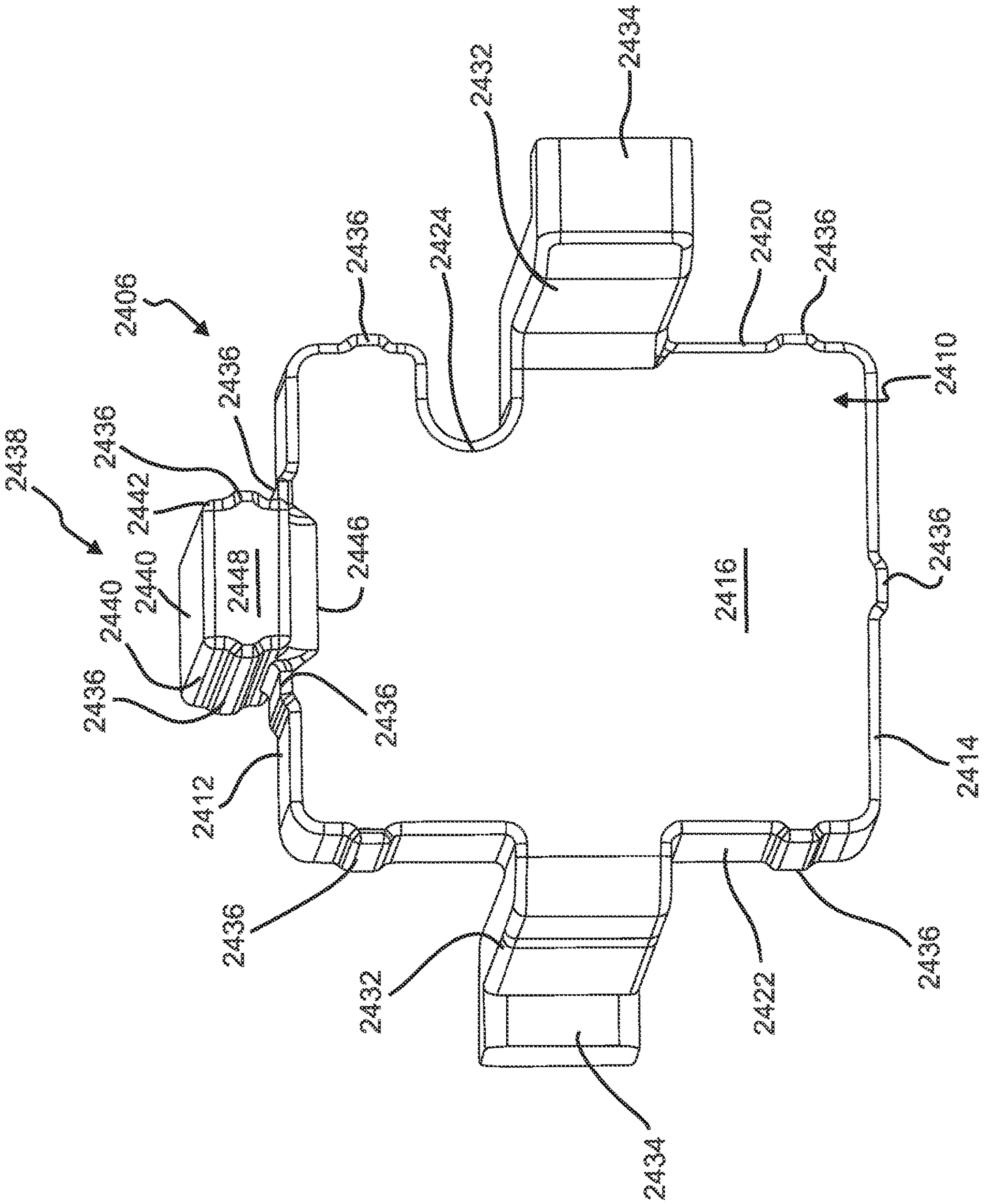
FIG. 25 is a perspective view of a contact sub-assembly of the coupler of FIG. 24.
Figure 26:
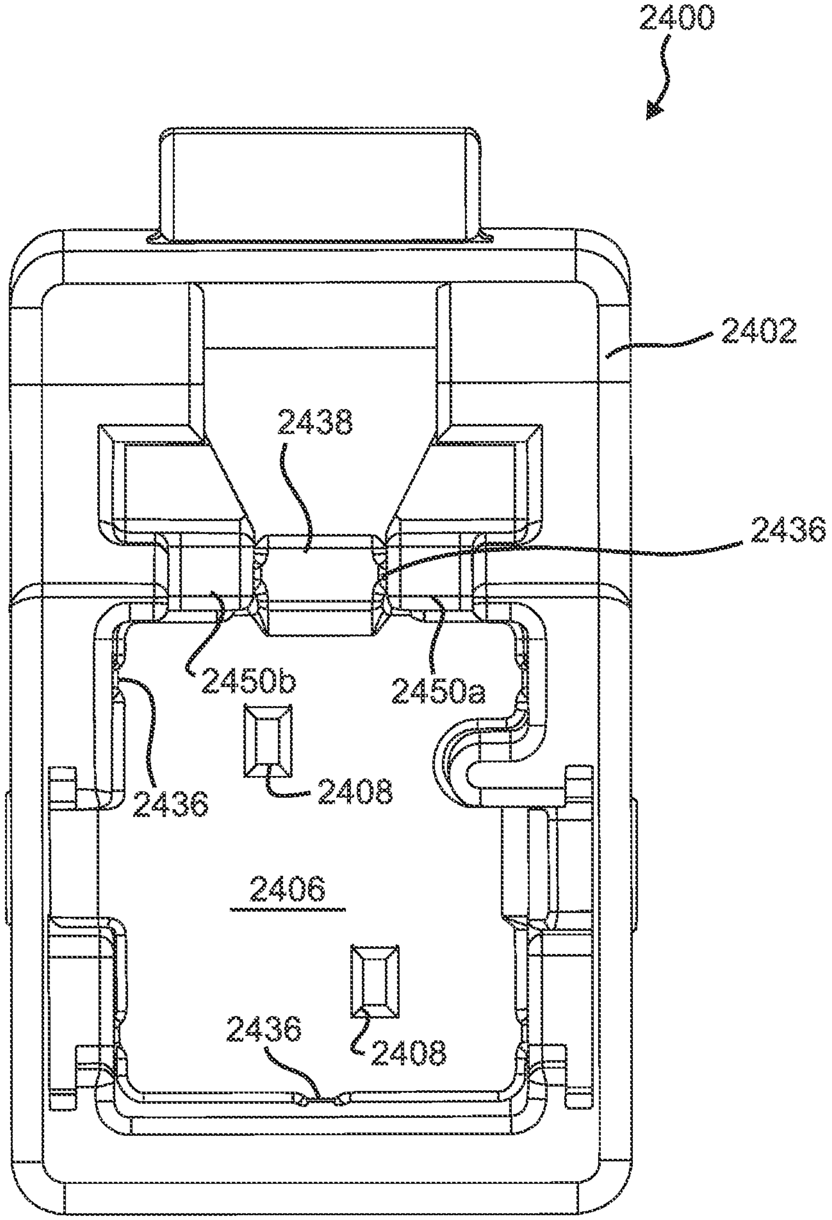
FIG. 26 is a forward view of the coupler of FIG. 24.

FIGS. 24-26 illustrate another example embodiment of a coupler 2400 in a shielded configuration. The coupler 2400 generally corresponds to the coupler 1800 however modifications to coupler 1800, now evident in coupler 2400, can be appreciated with respect to FIGS. 24-26. As shown, the coupler 2400 includes a singular metal housing 2402, four bonding shield contacts 2404 and a contact sub-assembly 2406 that includes a body 2407 and a single pair of contacts 2408.

The contact sub-assembly 2406, illustrated in FIG. 25 with contacts 2408 removed, is of a symmetrical configuration. The contact sub-assembly 2406 presents a central block portion 2410 that includes an upper face 2412 opposing a lower face 2414 with the upper and lower faces 2412, 2414 connected by first and second opposing broad side faces 2416, 2418 (not shown) and by first and second narrow side faces 2420, 2422. The first narrow side face 2420 incorporates a channel 2424 to interface with the coupler housing 2402. First and second latch arms 2432 extend from the approximate center of each of the first and second narrow side faces 2420, 2422 with each of the first and second latch arms 2432 including a corresponding lip edge 2434. Each of the latch arms 2432 flexes relative to the central block portion 2410 to enable insertion of the contact sub-assembly 2406 within the coupler housing 2402.

Each of the upper and lower faces 2412, 2414 and each of the first and second narrow side faces 2420, 2422 includes one or more crush ribs 2436. The crush ribs 2436 help to prevent excess movement of the contact sub-assembly 2406 and its contacts 2408 once positioned within the coupler housing 2402 by providing an interference condition with the inside surfaces of the coupler housing 2402. Extending from the upper face 2412 of the central block portion 2410 of the contact sub-assembly 2406 is an anti-rotation feature 2438. The anti-rotation feature 2438 generally comprises an elongate structure having first and second elongate side faces 2440, 2442, each of which incorporates a crush rib 2436, as well as upper and lower faces 2444, 2446, and opposing first and second rectangular faces 2448, 2450 (not shown). The first and second elongate side faces 2440, 2442 are of a greater width than the first and second narrow sides faces 2420, 2422 and, thereby, project the first and second rectangular faces 2448, 2450 beyond the plane defined by the first and second opposing broad side faces 2416, 2418, respectively. As shown in FIG. 26, the cross bar 1836 of the coupler 1800 has been divided into two portions 2450*a*, 2450*b* in the coupler 2400. The anti-rotation feature 2438 enhances stabilization of the contact sub-assembly 2406 by establishing an interference fit, via crush ribs 2436, with the crossbar portions 2450*a*, 2450*b*. Stabilization of the contact sub-assembly help to ensure a good alignment of the contact interface, e.g., interface of contacts 2408 and turning fork contacts 206*a*, 206*b* of connectors 200. Coupling of first and second connectors with any of the couplers described herein enables the transfer of both power and data from the first connector to the second connector, via the contacts of the coupler.

As with the other coupler embodiments disclosed herein, the shielded coupler 2400 can also be manufactured in an unshielded configuration by eliminating the bonding shield contacts 2404 and manufacturing the housing from a non-conductive material (e.g., a plastic).

Figure 27:
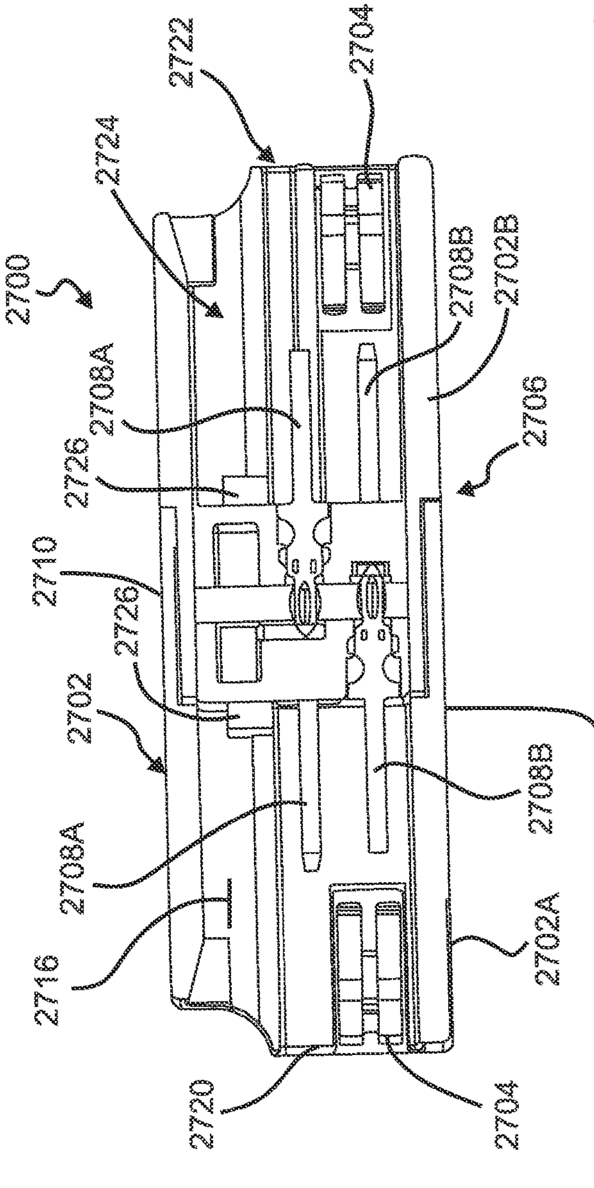
FIG. 27 is a cross-sectional view of another embodiment of a coupler with a contact sub-assembly including a circuit board.
Figure 28:
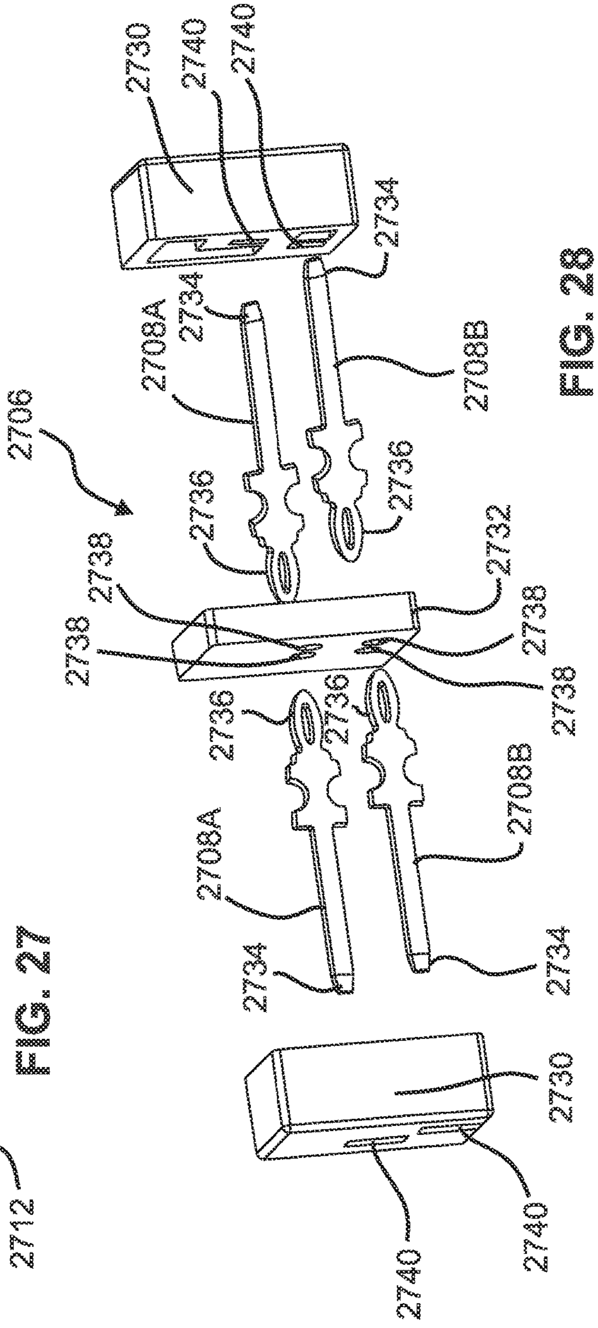
FIG. 28 is a perspective exploded view of the contact sub-assembly of FIG. 27.

Referring now to FIGS. 27 and 28 another embodiment of a coupler 2700 is illustrated. As shown, the coupler 2700 generally corresponds to the other couplers described herein and includes a singular metal housing 2702, four bonding shield contacts 2704 (only two are shown) and a contact sub-assembly 2706.

The housing 2702, which is die cast in a symmetrical configuration, includes an upper face 2710 and a lower face 2712 connected by a first side face (not shown) and a second side face 2716 that, together, define identical first and second end faces 2720, 2722. The first and second faces 2720, 2722 surround a central cavity 2724 that extends the length of the coupler 2700 between first and second end face 2720, 2722. Each of the first and second end faces 2720, 2722 is configured to interface with and retain the cantilevered latch 230 of one of the connectors 200. Tabs 2726 are provided within the central cavity 2724 to assist in positioning and retaining the contact sub-assembly 2706. In certain embodiments, the housing 2702 is composed of two distinct sections 2702A and 2702B that mechanically interface to form a completed housing 2702; a two section housing provides a configuration in which the contact sub-assembly 2706 is more easily installed. In certain embodiments, the housing 2702 is of a unitary configuration. The housing 2702 can be of a shielded or unshielded configuration.

The contact sub-assembly 2706 includes two pairs of contacts 2708, with each pair of contacts including a first contact 2708A and a second contact 2708B, as well as two support blocks 2730 and a circuit board 2732. Each of the contacts 2708 includes a first end 2734 comprising a pin contact that is received within the tuning fork receptacle contacts 254*a*, 254*b* of the connector 200 and a second end 2736 into a corresponding via 2738 on the circuit board 2732. Each pair of contact 2708 is supported by a respective slot 2740 of the contact support block 2730 through which the contact 2708 extends. The contact support blocks 2730 are preferably of a lightweight non-conductive material such as plastic. A first set of traces on the circuit board 2732 electrically connects the first contacts 2708A of the two pairs of contacts 2708 while a second set of traces on the circuit board 2732 electrically the second contacts 2708B of the two pairs of contacts 2708.

It will be appreciated that aspects of the above embodiments may be combined in any way to provide numerous additional embodiments. These embodiments will not be described individually for the sake of brevity.

While the present invention has been described above primarily with reference to the accompanying drawings, it will be appreciated that the invention is not limited to the illustrated embodiments; rather, these embodiments are intended to disclose the invention to those skilled in this art. Note that features of one or more embodiments can be incorporated in other embodiments without departing from the spirit of the invention, for example, receptacle contacts can be replaced with pin contacts and, correspondingly, pin contacts can be replaced by receptacle contacts in the various connector and coupler configurations. In the drawings, like numbers refer to like elements throughout. Thicknesses and dimensions of some components may be exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Spatially relative terms, such as “under”, “below”, “lower”, “over”, “upper”, “top”, “bottom” and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

Herein, the terms "attached", "connected", "interconnected", "contacting", "mounted" and the like can mean either direct or indirect attachment or contact between elements, unless stated otherwise.

Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

The invention claimed is:

1. A coupler comprising:

a housing including a channel having openings at a first end and a second end of the housing, the first end receiving a first connector and the second end receiving a second connector, the first connector having a first pair of contacts and the second connector having a second pair of contacts; and a contact sub-assembly including exactly one pair of coupler contacts and a body portion supporting the exactly one pair of coupler contacts, the contact sub-assembly being positioned centrally within the housing and including an anti-rotation feature, and the exactly one pair of coupler contacts electrically coupling the first pair of contacts with the second pair of contacts.

2. The coupler of claim 1, wherein the body portion supports the anti-rotation feature.

3. The coupler of claim 2, wherein the anti-rotation feature is of a greater width than a width of the body portion.

4. The coupler of claim 2, wherein the body portion of the contact sub-assembly includes a pair of latch arms that interface with openings in the housing.

5. The coupler of claim 1, wherein the anti-rotation features include a crush rib that creates an interference fit with an interior surface of the housing.

6. The coupler of claim 2, wherein the body portion includes a plurality of crush ribs that create an interference fit with an interior surface of the housing.

7. The coupler of claim 1, wherein the housing is of a symmetric configuration.

8. The coupler of claim 1, wherein the contact sub-assembly is of a symmetric configuration.

9. A coupler, comprising a metal housing having a first end that receives a first connector and a second end that receives a second connector; and a contact sub-assembly including a body supporting exactly one pair of coupling contacts, the body including a plurality of crush ribs to establish an interference fit with an interior surface of the metal housing, the exactly one pair of coupling contacts comprising a first coupling contact and a second coupling contact, each of the first and second coupling contacts contained within the metal housing and each of the first and second coupling contacts electrically coupling the first connector with the second connector while maintaining electrical polarity.

10. The coupler of claim 9, wherein the first coupling contact crosses over the second coupling contact to maintain electrical polarity.

11. The coupler of claim 9, wherein the metal housing includes a first pair of opposing bonding contacts at the first end and a second pair of opposing bonding contacts at the second end.

12. The coupler of claim 11, wherein each contact of the first and second pair of bonding contacts are individually retained within a recess in the interior surface of the metal housing.

13. The coupler of claim 9, wherein the metal housing is of a symmetric configuration.

14. The coupler of claim 9, wherein the contact sub-assembly is of a symmetric configuration.

15. The coupler of claim 9, wherein the contact sub-assembly includes a pair of latch arms that interface with openings in the metal housing.

16. The coupler of claim 9, wherein the first connector has exactly two contacts comprising a first contact and a second contact, the first contact coupled to a first electrical conductor and the second contact coupled to a second electrical conductor, and wherein the second connector has exactly two contacts comprising a third contact and a fourth contact, the third contact coupled to a third electrical conductor and the fourth contact coupled to a fourth electrical conductor, wherein the first coupling contact electrically couples the first contact of the first connector with the third contact of the second connector while maintaining electrical polarity, and wherein the second coupling contact electrically couples the second contact of the first connector with the fourth contact of the second connector while maintaining electrical polarity.

17. The coupler of claim 16, wherein the first connector transmits both power and data through the coupler to the second connector.

* * * * *